US011048921B2

(12) United States Patent
Sorci et al.

(10) Patent No.: US 11,048,921 B2
(45) Date of Patent: Jun. 29, 2021

(54) IMAGE PROCESSING SYSTEM FOR EXTRACTING A BEHAVIORAL PROFILE FROM IMAGES OF AN INDIVIDUAL SPECIFIC TO AN EVENT

(71) Applicant: nViso SA, Lausanne (CH)

(72) Inventors: Matteo Sorci, Morges (CH); Timothy Llewellynn, Saint-Prex (CH)

(73) Assignee: nViso SA, Lausanne (CH)

( * ) Notice: Subject to any disclaimer, the term of this patent is extended or adjusted under 35 U.S.C. 154(b) by 72 days.

(21) Appl. No.: 16/403,656

(22) Filed: May 6, 2019

(65) Prior Publication Data
US 2019/0347478 A1 Nov. 14, 2019

Related U.S. Application Data

(60) Provisional application No. 62/668,856, filed on May 9, 2018.

(51) Int. Cl.
*G06K 9/00* (2006.01)
*G06N 3/08* (2006.01)
(Continued)

(52) U.S. Cl.
CPC ..... *G06K 9/00335* (2013.01); *G06K 9/00671* (2013.01); *G06K 9/6267* (2013.01); *G06N 3/08* (2013.01); *G06Q 40/08* (2013.01)

(58) Field of Classification Search
CPC .............. G06K 9/627; G06K 9/00671; G06K 9/00335; G06K 9/00302; G06K 9/4628;
(Continued)

(56) References Cited

U.S. PATENT DOCUMENTS 5,905,807 A 5/1999 Kado et al.
6,526,161 B1 2/2003 Yan
(Continued)

FOREIGN PATENT DOCUMENTS

WO   WO   1/2016
PCT/US2016/015181

OTHER PUBLICATIONS

David C. Howell, "Statistics in Psychology," 8th Edition, University of Vermont, Wadsworth Cengage Learning Publication, 2013, ISBN-13 978-1-111-83548-4—Abstract.
(Continued)

*Primary Examiner* — Brenda C Bernardi
(74) *Attorney, Agent, or Firm* — Andre Roland S.A.; Nikolaus Schibli

(57) ABSTRACT

An automated method for assessing a behavioral profile of an individual based on image processing, the behavior profile being specific to a hypothetical or actual event, the method including the steps of detecting non-verbal communication from a physiognomical expression of the individual based on image data by a first computer algorithm, the image data being created by exposing the individual to a stimulus and obtaining the physiognomical expression of the individual in response to the stimulus, correlating features of the non-verbal communication to a topical area by a second computer algorithm, and generating a report corresponding to the individual that reflects the correlation between the non-verbal communication and the topical area, the report including the behavior profile of the individual.

19 Claims, 17 Drawing Sheets

(51) Int. Cl.
*G06Q 40/08* (2012.01)
*G06K 9/62* (2006.01)

(58) Field of Classification Search
CPC .... G06K 9/00248; G06K 9/6267; G06N 3/08; G06N 3/0454; G06Q 40/08
See application file for complete search history.

(56) References Cited

U.S. PATENT DOCUMENTS

| | | | |
|---|---|---|---|
| 6,661,907 B2 | 12/2003 | Ho et al. | |
| 7,324,670 B2 | 1/2008 | Kozakaya et al. | |
| 8,235,725 B1* | 8/2012 | Hill | G06Q 30/02 434/236 |
| 8,571,272 B2 | 10/2013 | Gokturk et al. | |
| 2005/0013479 A1 | 1/2005 | Xiao et al. | |
| 2005/0169536 A1 | 8/2005 | Accomazzi et al. | |
| 2006/0184800 A1 | 8/2006 | Rosenberg | |
| 2006/0206371 A1* | 9/2006 | Hill | G06Q 30/0203 705/7.32 |
| 2007/0159344 A1 | 7/2007 | Kisacanin | |
| 2007/0265507 A1* | 11/2007 | de Lemos | A61B 5/16 600/300 |
| 2010/0013832 A1 | 1/2010 | Xiao et al. | |
| 2010/0179950 A1* | 7/2010 | Willcock | G16H 50/30 707/723 |
| 2011/0038547 A1* | 2/2011 | Hill | G06K 9/00335 382/195 |
| 2012/0002848 A1* | 1/2012 | Hill | A61B 5/167 382/118 |
| 2012/0259240 A1* | 10/2012 | Llewellynn | G06Q 30/02 600/558 |
| 2014/0055342 A1 | 2/2014 | Kamimura et al. | |
| 2015/0332303 A1* | 11/2015 | Kodali | G06Q 30/0226 705/14.25 |
| 2016/0189172 A1* | 6/2016 | Camp | G06K 9/00355 705/7.29 |
| 2016/0259994 A1 | 9/2016 | Ravindran et al. | |
| 2017/0095192 A1 | 4/2017 | Sadowsky et al. | |

OTHER PUBLICATIONS

Harrison, Allen F., and Robert M. Bramson, "The Art of Thinking," The Classic Guide to Increasing Brain Power, Berkley, 2002, ISBN-13: 978-0425183229—Abstract.

William 'Ned' Herrmann, "The creative brain," The Journal of Creative Behavior, vol. 25, No. 4, 1991, pp. 275-295.

"Introduction to the HBDI® and the Whole Brain® Model," Technical Overview & Validity Evidence, 2016, http://engage.herrmannsolutions.com/hubfs/Whole_Brain_Thinking_and_the_HBDI-Technical Overview-Validity_Evidence-Jan.

Sorci, Matteo, "Automatic face analysis in static and dynamic environments." Ecole Polytechnique Fédérale de Lausanne EPFL, Thesis 4357, Apr. 24, 2009.

* cited by examiner

Stated Priorites

| Priorities | | Your Peers | You | Spouse |
|---|---|---|---|---|
| Cash Flow | | 4 | 4 | - |
| Investment Portfolio | | 2 | 2 | - |
| Family & Giving | | 3 | 3 | - |
| Retirement | | 1 | 1 | - |
| Financial Advisor | | 6 | 6 | - |
| Financially Organized | | 5 | 5 | - |

FIG. 5C

Stated Priorites

| | | | |
|---|---|---|---|
| Cash Flow | | ———— | 4th |
| Investment Portfolio | | ———— | 2nd |
| Family & Giving | | ———— | 3rd |
| Retirement | | ———— | 1st |
| Financial Advisor | | ——— | 6th |
| Financially Organized | | ——— | 5th |

FIG. 5D

Emotional Priorites

| Priorities | | Your Peers | You | Spouse |
|---|---|---|---|---|
| ↻ | Cash Flow | 1 | 4 | - |
| 🏦 | Investment Portfolio | 2 | 3 | - |
| 👪 | Family & Giving | 4 | 1 | - |
| ⚓ | Retirement | 5 | 2 | - |
| 📊 | Financial Advisor | 3 | 5 | - |
| 💵 | Financially Organized | 6 | 6 | - |

Emotional Priorites

| Cash Flow | ↻ | 4th |
| Investment Portfolio | 🏦 | 3rd |
| Family & Giving | 👪 | 1st |
| Retirement | ⚓ | 2nd |
| Financial Advisor | 📊 | 5th |
| Financially Organized | 💵 | 6th |

IMAGE PROCESSING SYSTEM FOR EXTRACTING A BEHAVIORAL PROFILE FROM IMAGES OF AN INDIVIDUAL SPECIFIC TO AN EVENT

CROSS-REFERENCES TO RELATED APPLICATIONS

The present patent application claims priority to the U.S. provisional application with the Ser. No. 62/668,856 that was filed on May 9, 2018, the entire content thereof herewith incorporated by reference.

FIELD OF THE INVENTION

The present invention is directed to the field of computer-automated analysis and assessment of human behavior and human emotional reactions based on image processing, and to the field of biometrics to analyze micro-facial expressions and features, including devices, systems and methods of performing such analysis.

BACKGROUND

In the field of decisions to purchase or invest into different types of financial assets and securities for a specific client, human decisions by the financial manager or account manager that consults the specific client are often made given a specific social context, expectation, and experiences of an individual. For example, the previous experience and bias of a human decision maker for establishing a financial investment portfolio can lead to a biased and inappropriate selection of financial products for the specific client to invest in. This can lead to a decision on a purchase of a financial asset that may be too volatile for the actual emotional landscape of the specific client. For example, in a family portfolio investment setting, commonly the male head of household will make the purchasing decisions, quite often wanting to invest in relatively risky positions, corresponding to his stereotypical gender role. However, as he is investing for his family, negative portfolio results may lead to family problems that were not fully contemplated by the male head of household. In a scenario concerning insurance products, certain live events could lead to financial losses that could be far outside of the emotional tolerance of the insured. Unfortunately, due to gender role and bias, racial roles and bias, or general unawareness of the emotional mindset of the insured, poor, insufficient or simply an improper insurance coverage is purchased.

Moreover, in the field of human resources, decisions on hiring an individual for a specific job role or project, or for providing a specific security clearance for a job task or mission are usually done by human decision makers, that interview the candidate. These decisions are usually supported by questionnaires and an analysis of documents and references provided by the candidate, and background checks. However, these human decision makers are prone to make wrong or only partially appropriate decisions, as they may include their own human bias to the decision making process. Also, quite often there is simply not enough time available to properly analyze a human candidate. It is noted that in many job fillings, for example governmental job fillings, it is strictly required to eliminate certain type of human bias from the decision process, for example bias based for example but not limited to on race, gender, national origin, sexual orientation. It is therefore difficult to make a proper decision solely when humans analyze a job candidate. Sometimes a polygraph test is used, but it has been proven that the polygraph test is not very effective, and can be successfully flawed or evaded by a skilled participant.

Therefore, in light of the above described deficiencies in the field of analyzing a human being for his fitness, match and suitability for a specific event, or hypothetical event, or financial commitments, strongly improved automated systems and methods are desired to analyze a human being for his suitability, fitness, or competence for a specific event, or a plurality of events that are associated with a specific topical area, whether it is a real or hypothetical event.

SUMMARY

According to one aspect of the present invention, an automated image processing method for assessing a behavioral profile of an individual is provided, the behavior profile being specific to a hypothetical or actual event. Preferably, the method includes the steps of detecting non-verbal communication from a physiognomical expression of the individual based on a signal by a first computer algorithm, the signal being created by exposing the individual to a stimulus and obtaining the physiognomical expression of the individual in response to the stimulus, correlating features of the non-verbal communication to a topical area by a second computer algorithm, and generating a report corresponding to the individual that reflects the correlation between the non-verbal communication and the topical area, the report including the behavior profile of the individual.

According to another aspect of the present invention, a learning method for a multilayer neural network is provide, the learning method being implemented by a computer. Preferably, the learning method includes the steps of providing a first image data training set having image sequences of individuals expression emotions, facial expressions of the individuals that show the emotions being described by using a facial action coding system (FACS), and training the neural network with the first image data training set.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 4B shows a question prompt of a graphical user interface to gather contextual information of user U related to application A, topical area TA, and/or events E, FIG. 4C shows an introduction screen of a graphical user interface before showing the stimulus I by stimulus player S25, to give instructions to the user U for viewing or experiencing stimulus I, FIG. 4D showing an user interface showing the face of user U to aid the user U to center his face to the camera, FIG. 4E showing the playing of the stimulus I with the face of the user U shown in parallel to the playing in a sub-window in one of the corners. FIG. 4F shows an prompts screen indicating that report has been generated, after stimulus I has been played;

FIG. 5A to 5F show different exemplary views of the generated reports of method 100 and system 200, for example by a graphical user interface, with FIG. 5A showing an exemplary graph of a timely evolution of a chosen emotional factor EF during the time period TP of the stimulus I, associated to different period sections, FIG. 5B showing a rating of the different topical areas TP, with a reference line showing an average value for peers, FIG. 5C showing a rating of the different topical areas TP of user U as compared to peers, FIG. 5D showing a stated priority ranking of the different topical areas TP of user U, FIG. 5E showing a calculated emotional priority ranking of the different topical areas TP of user U based on method 100 and system 200, FIG. 5F showing a ranking of the emotional priorities.

Herein, identical reference numerals are used, where possible, to designate identical elements that are common to the figures. Also, the representations in the figure are simplified for illustration purposes and may not be depicted to scale.

DETAILED DESCRIPTION OF THE SEVERAL EMBODIMENTS

Figure 1A:
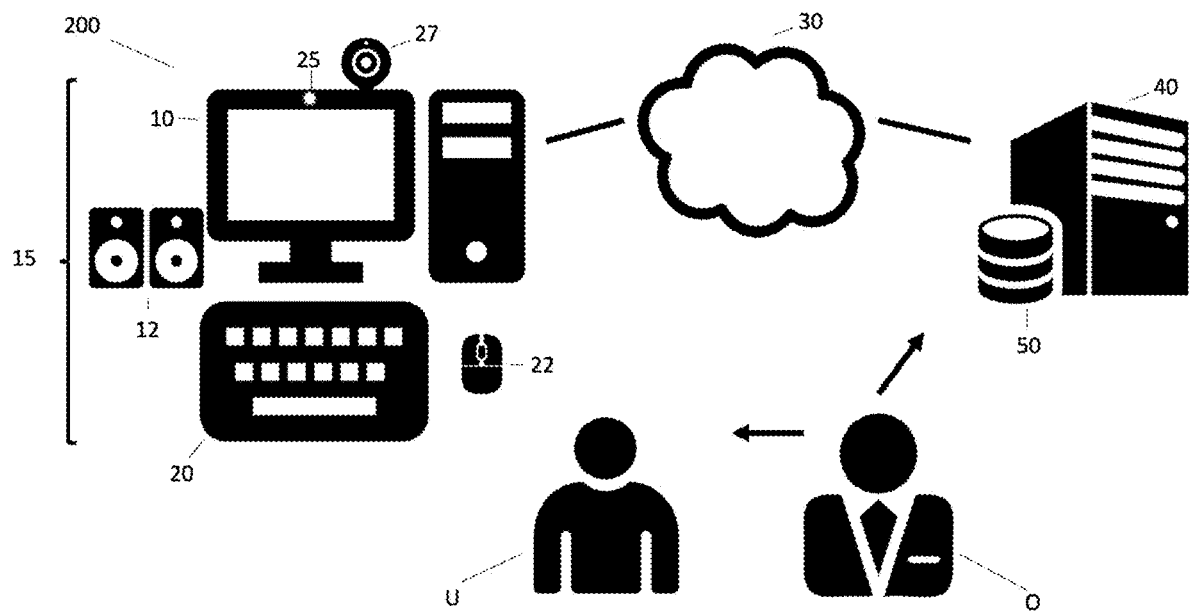
FIGS. 1A to 1H schematically show a system 200 and different stages of the method 100 for assessing a behavioral profile of a user U, according to one aspect of the present invention, with FIG. 1A showing a simplified overview of the system 200, FIG. 1B showing a schematic and simplified overview of the method 100, FIG. 1C showing a schematic representation of the structure of a stimulus I along a timeline, for example a video presentation, FIG. 1D showing schematically a flowchart of a detailed view of step S20 of the method 100 for analyzing user distractions, FIG. 1E showing schematically a flowchart of a detailed view of step S35, and FIG. 1F showing an exemplary, detailed view of the convolutional neural network 5C (CNN) used in step S35, FIG. 1G showing a variant depicting a flowchart of a detailed view of step S35 in case S40 is implemented by a convolutional neural network, as shown in FIG. 1F, and FIG. 1H schematically shows a schematic representation of a development system for training the neural network, or other machine learning scheme, and the deployment of the learned neural network parameters to system 200 for image analysis with for example step S35.

FIG. 1A shows a schematic view of a system 200 for performing the method 100 for performing image processing with the goal of assessing a behavioral profile of a user or individual, the behavior profile being specific to a hypothetical or actual event, and FIG. 1A shows a simplified schematic view of the automated method 100 that can be performed by system, according to one aspect of the present invention. For example, the method 100 can be performed by a computer device 15 having a display device 10, speakers 12, and data input device for example a keyboard 20, keypad, trackpad, and a computer mouse 22, and also including a video camera 25 or other type of image capturing device, and a microphone 27, and connected to a network 30 with a network interface that in turn is connected to a server 40 and a database 50, for example a cloud-based storage system, distributed or local hard drive. User U can access and operate computer device 15. It is also possible that computer device 15 is connected to another type of display device 10, for example but not limited to a projector, monitor, television, screen, display unit, virtual reality headset, head-up display device, or other type of audio device than speakers 12, for example but not limited to head phones, ear phones, ear buds. Computer device 15 can include different types of electronic data processing devices, for example but not limited to a smartphone, a tablet, a desktop computer, a notebook, a workstation, a dedicated data processing device. Moreover, it is also possible that an operator O, for example an advisor that is using method 100 and system 200 has his own terminal or computer device accessing the system 200 via network 30, including a display device, network interface, speakers, camera, microphone, and data input devices.

Figure 1C:
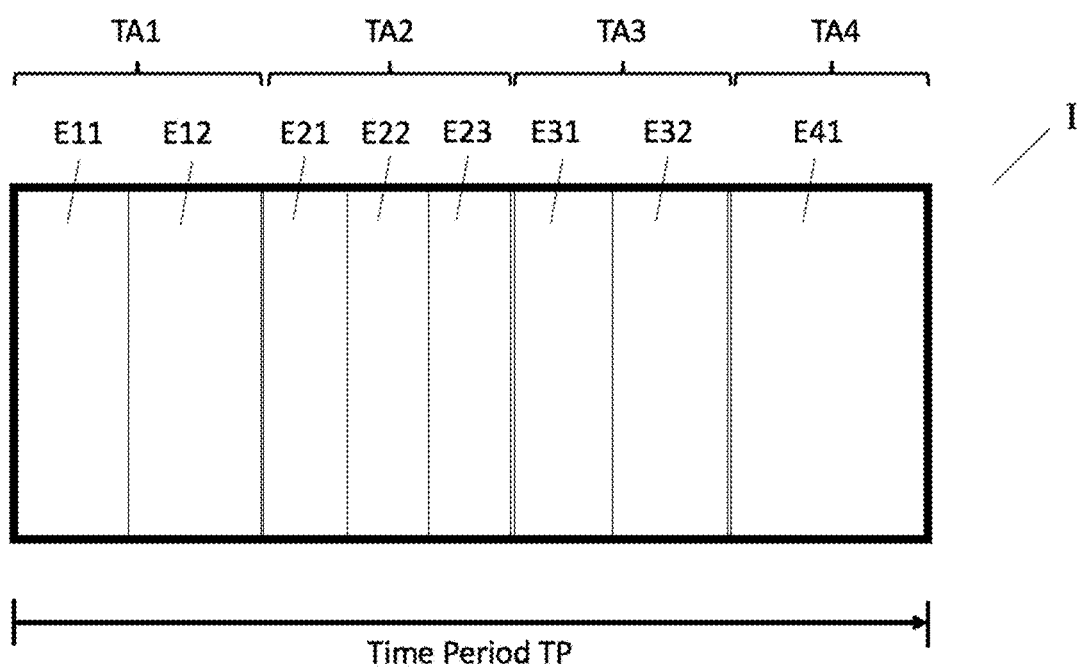
Figure 1B:
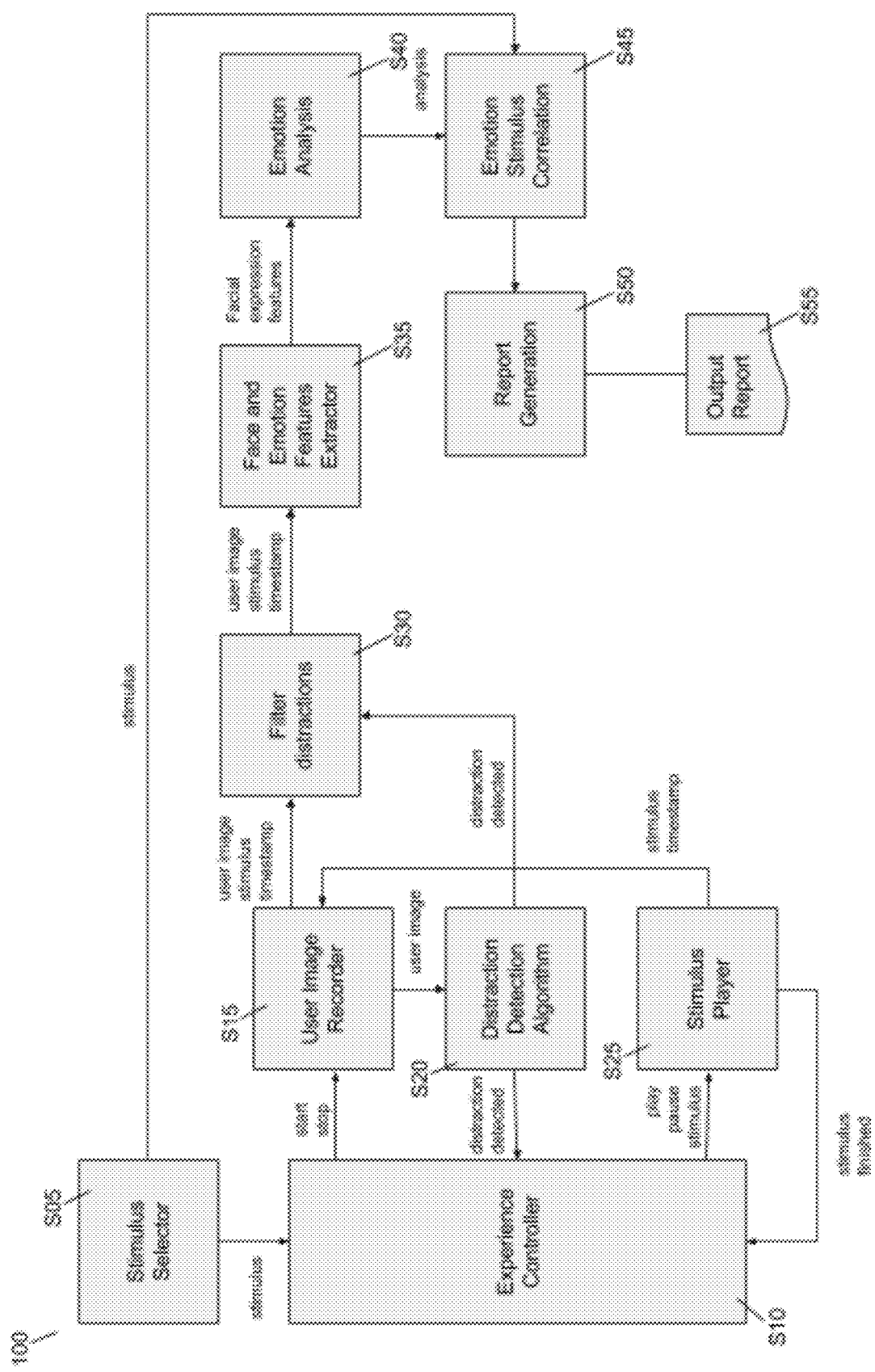

In the method 100, as shown in FIG. 1B, a first step S05 can be performed, where an appropriate stimulus I is selected or chosen for a specific user U, or for a specific application A, or both. For example, the stimulus I can be chosen from a set of prepared and pre-stored stimuli I, for example stored on the database 50 or locally on the computer 10. As further explained below, the stimulus I can be an audio-visual presentation that can be presented to user U, for example via a computer screen or other display device 10. The stimulus I that will be presented to user U can be chosen based on a type of application A. As an example, one application A can be the analysis of a user U for his emotional suitability for a potential investment portfolio, another application A can be the assessment of a user U for his emotional fitness to perform at a potential job role or project, yet another application can be the assessment of a user U for his emotional fitness for a projected personal life situation. As another example of an application A, the application can be the analysis of user U for his emotional tolerance for a life situation that will have an insurance coverage, or for which an insurance coverage is denied, limited, or capped, for example health care or life insurance policies. For example, it could be a hypothetical event that would lead to full, partial or no insurance coverage.

As a another example, an emotional reaction of the user U to different marketing or commercials of a product or surface can be evaluated, for example a video clip or television commercial for said product. For example, different marketing communication presentations can be tested on a user U, for example marketing commercials in the form of a video clip or television commercial, marketing packaging and presentation of a product, marketing logos and slogans, marketing flyers, radio commercials, web commercials and their audiovisual presentation, to compare the emotional reaction of user U on different types of marketing communication, and comparing his reaction to peers, to evaluate, rank and classify the different marketing communication presented to user in stimulus I.

To choose application A and/or to configure the method 100 or system 200 for a specific user U, in step S05, it is possible that method 100 presents a prompt, graphical user interface, or questionnaire to user U, or to an operator O of method 100, in which the application A is chosen. The step S05 can be used to configured method 100 and system 200 specific to a user U based on various information on the user U, the specific application A, and the type of user U. For example, a graphical user interface showing a selection of applications A can be shown, where user U or operator O can choose a specific application A that user U will be subjected to. It is also possible that method 100 is fixedly programmed for a specific application A, and that no application A can be chosen. Based on the chosen or preselected application A, it is possible to select an appropriate stimulus I. Based on the choice made, a stimulus I can be selected from a group of prepared and pre-stored stimuli, specific to the application A.

As further explained below, stimulus I can be an audiovisual presentation having a duration or time period TP that can be presented to user U, in which audiovisual sequences of different topical areas TA are presented to user U, for example each topical area presenting one or more hypothetical or potential event or life situation to user U, the event being related to application A. The topical areas TA of stimulus I can be chosen such that user U is projected into a future or imminent hypothetical life situation or event that would affect at least one factor of the subject of application A. For example, in the variant of the method 100 where application A being the evaluation or assessment of user U for his emotional suitability when owning or investing in a specific investment portfolio, in other words the subject of application A being the assessment of emotional suitability and fitness of user U with respect to a proposed investment portfolio, the topical areas TA can be different hypothetical financial scenarios that are presented in a personalized fashion to user U, for example but not limited to a topical area TA describing an event E leading to a reduction of a substantial percentage, for example 20% of the retirement savings, a topical area TA describing an event E leading to a sudden reduction of the availability of cash, a topical area TA describing an event E leading to a reduction in the availability or target savings goals for the children of the user's college saving plans.

Accordingly, in certain situation, the stimulus I may need to be chosen to the personal or specific to user U, for example to take into account and be adapted and specific his life situation, his demographical status, family situation. As an example, stimulus I may need to be chosen based on a personal profile of user U, including the gender of user, as males and females react differently to different types of stimulus, based on the age of the user, based on projected retirement age, based on the family situation including marital status, number of children, progeny, dependents, if no children whether children are planned, based on income, income bracket, based on overall wealth of user, based on educational level, status and type, based on the depth of his work experience and fields of work, based on race, based on national origin, based on his place of living, based on nationality.

Figure 4A:
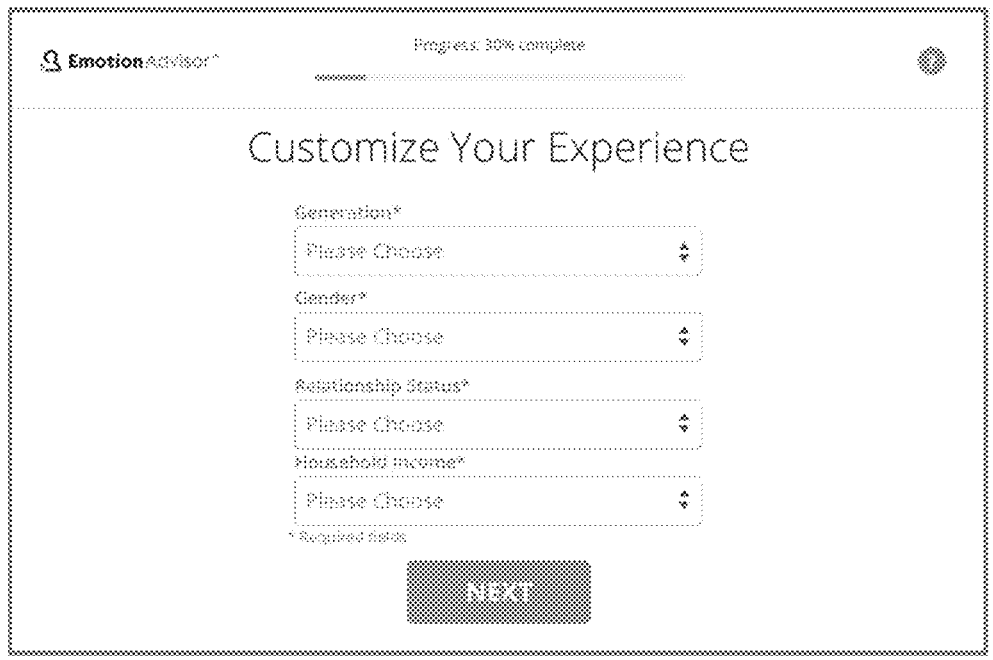
FIGS. 4A to 4F show different exemplary views of a graphical user interface for showing different information related to method 100 and system 200, with FIG. 4A showing a question prompt of a graphical user interface to gather personal profile data of user U.
Figure 4B:
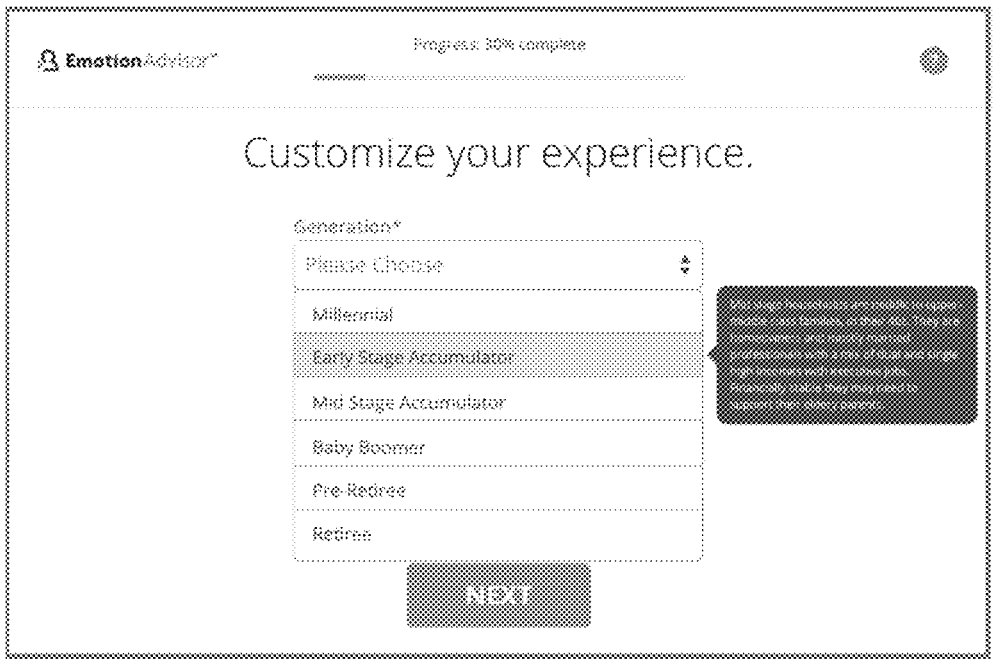
Figure 4C:
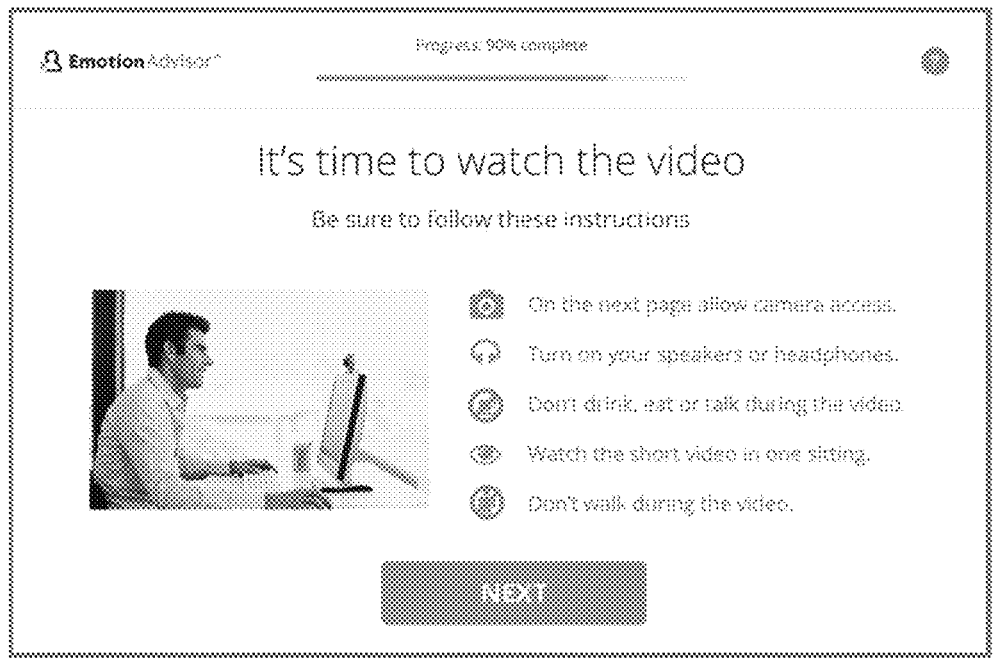
Figure 4D:
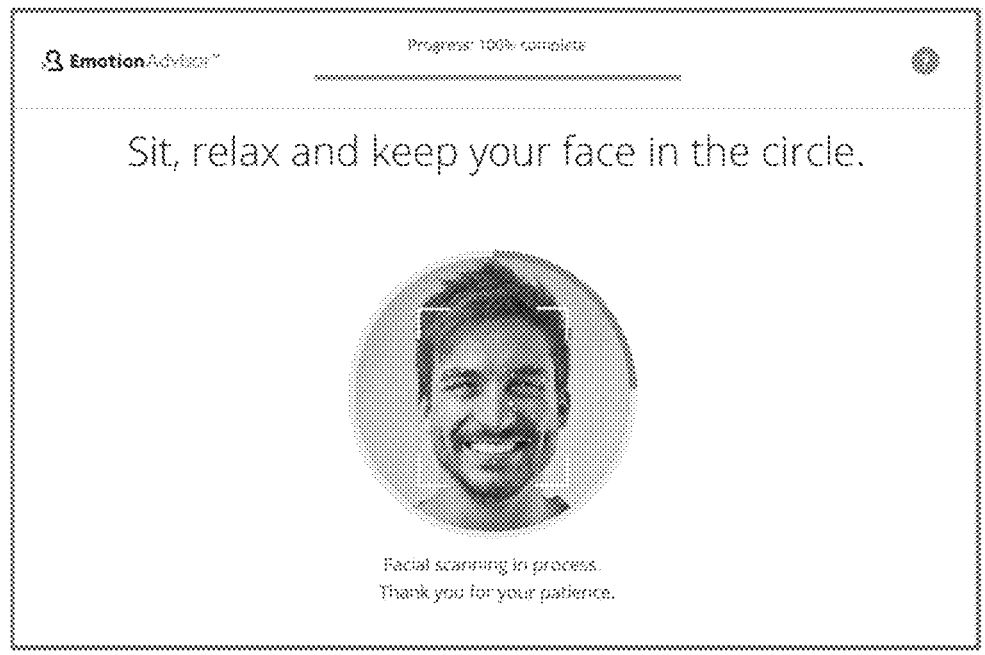
Figure 4E:
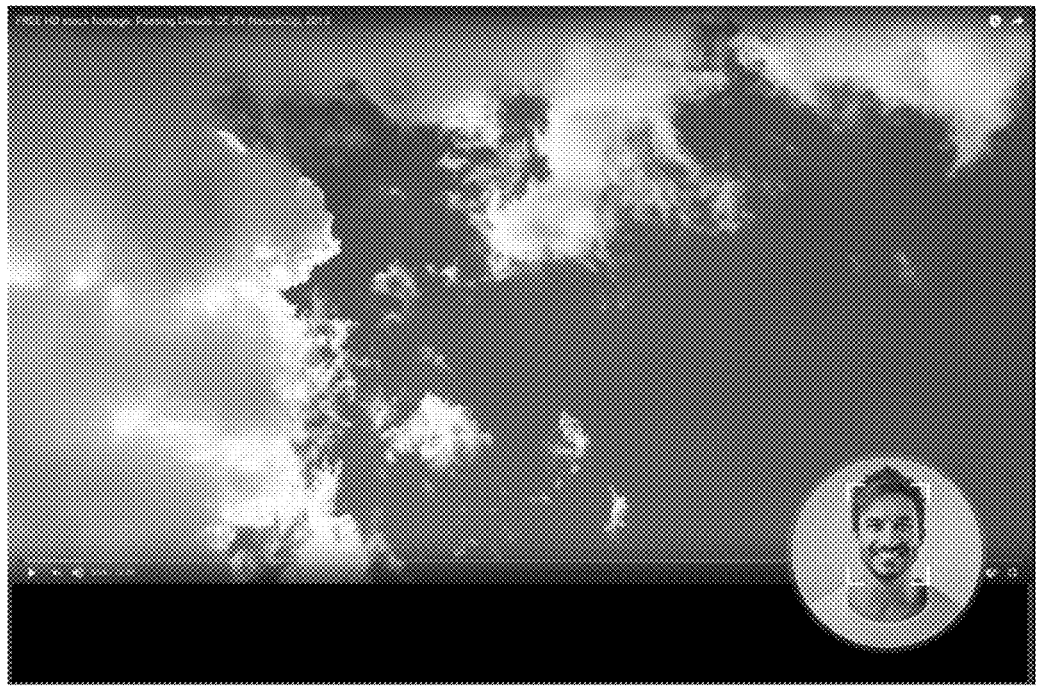
Figure 4F:
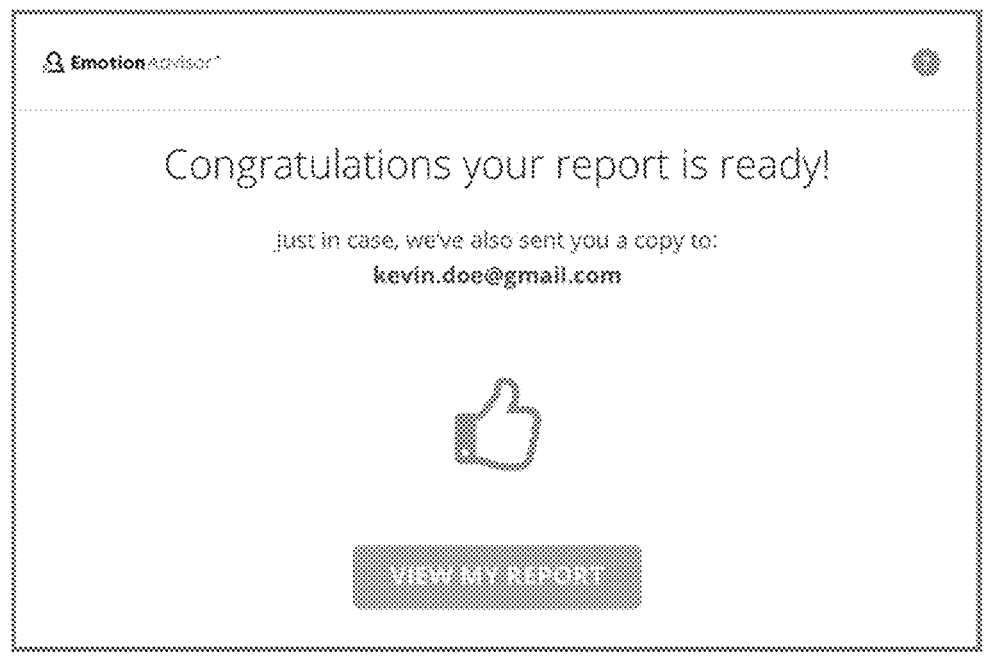

For example, as shown in FIG. 4B that depicts an exemplary graphical user interface that can be presented to user U, instead of directly selecting an age group, the user can select his generation that can be presented to him as a list to choose one option. For example, the different generation can be but are not limited to millennials, early stage accumulators, mid stage accumulators, baby boomer, pre-retiree, or retiree. In the example related to the presentation of different marketing material or commercials to evaluate an emotional response of user U, the stimulus I can be chosen based on his consumer behavior and profile of user U, for example by choosing a stimulus based on a past consumption profile of a user, for example by making a choice while having access to a previously generated consumer profile of e-commerce websites, such as but not limited to Ebay™, Amazon™, Sierra Trading Post™, AliExpress™, or having access to consumer profiles of user U from e-commerce portals of retail store companies, such as but not limited to Target™, Walmart™, Sears™ having information on monthly or annual consumer spending budgets, having information on educational level and educational type.

For example, in application A of assessment of emotional suitability and fitness of user U with respect to a proposed investment portfolio, in case the user U does not have any children, and is already of a certain age, for example being part of generation of baby boomers, it can be assumed that college saving plans for children are irrelevant, or financial support for children. Therefore, a stimulus I can be chosen that does not include an event E in the topical areas TA of stimulus I related to financial shortcomings or incurred losses in a college saving plan. As another example, if user U does not have a spouse, a life insurance event for providing for a life insurance for a spouse is also not relevant. Therefore, a stimulus I can be chosen that does not include an event E in the topical areas TA related to a deficiency or a shortcoming in the life insurance policy. As another example, in application A of assessment of emotional suitability and fitness of user U with respect to a proposed insurance portfolio, in case the user U is very young and does not have significant accumulated wealth, it can be assumed that life insurance and collection insurance have less significance than for example travel insurance. Therefore, a stimulus I can be chosen that does not include an event E in the topical areas TA of stimulus I related to potential risks related to collection of valuables such as art. As another example, if user U is very young, i.e. under 30 years of age, a projected tax problem for the retirement savings account after retirement age may not be relevant to user U. Therefore, a stimulus I can be chosen that does not include an event E in the topical areas TA related to the hypothetical event of a tax problem related to the retirement savings plan.

As another example, in application A of assessment of emotional suitability and fitness of user U with respect to a potential new employer, in case the user U is considering an engineering position, it can be assumed that marketing and legal aspects of the potential new employer have less significance to the user than engineering projects and company culture. Therefore, a stimulus I can be chosen that does not include an event E in the topical areas TA of stimulus I related to how the company manages their marketing and legal activities.

The user profile of user U can be entered manually by user U to method 100 by the use of a graphical user interface, for example with a visual representation of questionnaire form that asks the relevant questions to user U, as exemplarily and schematically shown in FIGS. 4A and 4B. Or user U can be guided by a voice presentation asking him or her questions, and answering these questions, and the answers are captured and analyzed by a voice recognition software that is operated on computer device 10. For example, commercially available speech-to-text and voice-to-text recognition software can be used, such as but not limited to Dragon NaturallySpeaking™, Nexmo™, Sonix™, Braina™. User profiles can also be pre-stored, or can be received from external devices over the network 30 or can be fully or partially generated by a biometrical analysis of user U, for example by analyzing his facial features with a biometrical software to determine age and gender, when the analysis software is operated on computer device 10, and the face of user U is captured by camera device 25. For this purpose, within step S05 of method 100, user U can be analyzed to gather, complement, or complete his user profile, either via a graphical user interface, and by the aid of automated process, for example a biometrical facial analysis, for example as discussed in U.S. Patent Publication No. 2006/0184800, this reference herewith incorporated by reference in its entirety.

Also, in a variant, the user U can be categorized based on different thinking styles. For example, in step S05, the user U can be prompted to answer different questions, so that he can be classified into different thinking style categories. As user U will predominantly belong to a thinking type, based on the different types of thinking styles that are available, and an assessment of user U as to his thinking type, it is possible to take into account different types of personalities of users U, and their different reaction to stimulus I. For example, the Bramson scheme can be used including the five (5) styles with synthesisists, idealists, pragmatist thinkers, analyst thinkers, and realist thinkers. See for example Harrison, Allen F., and Robert M. Bramson, "The Art of Thinking," The Classic Guide to Increasing Brain Power, Berkley, 2002, ISBN-13: 978-0425183229, this reference incorporated by reference in its entirety. Another classification scheme can be used, for example the four different styles of the Whole Brain model, including rational self, experimental self, safekeeping self, and feeling self, also sometimes referred to as the color model with the blue quadrant, yellow quadrant, green quadrant, and red quadrant. See William 'Ned' Herrmann, "The creative brain," The Journal of Creative Behavior, Vol. 25, No. 4, 1991, pp. 275-295. As another example, the Myers-Briggs type indicator can be used. As yet another example, user U can be classified based on the ten (10) archetypes including past: truthseeker, present organizer, future: visionary, past-present: curator, past-future: researcher, present-past: engineer, present-future navigator, future-past: explorer, future-preset: leader, past-present-future, connector.

The thinking style of user U can be determined based on a survey, logic test, or questionnaire that is presented to user U, for example with a graphical user interface asking questions, or by presenting another audiovisual presentation with questions that the user U can answer. Once the thinking style of user U is determined, it can be made part of the personal profile of user U for method 100 and system 200. This can include but is not limited to Herrmann Brain Dominance Instrument (HBDI), Learning Orientation Questionnaire, dominance, inducement, submission, and compliance (DISC) assessment, Keirsey Temperament Sorter (KTS) as a self-assessed personality questionnaire, Briggs Type Indicator (MBTI) as an introspective self-report questionnaire.

In the context of the method 100 and system 200, this allows to further evaluate the end result, for example the EPF from step S45, based on results from the same type of thinkers, to evaluate the risk within said category of thinkers, and not over an entire population.

In method 100, a step S10 is performed as an experience controller that can be operated in parallel with other operational steps, to control different aspects of method 100 related to the presentation of the stimulus I and distraction of user U, including the recording of a sequence of images or video of user U, to capture user images UI, in a step S15, for example via a camera device 25 that is operatively connected to computer device 15, and a corresponding operation software for capturing and storing the images from camera device 25 in the memory, the playing of a chosen stimulus I to user U with step S25 by a player, for example an audiovisual player software or hardware, and to receive a signal from the distraction detection algorithm S20, indicating whether user U is distracted or not, while playing stimulus I and recording user U in step S15 to provide for user images UI. For example, the experience controller S10 can stop, pause, or suspend the playback of stimulus I based on a detection of signal from distraction detection algorithm S20, once the distraction detection signal reaches a predefined threshold.

Figure 3A:
FIGS. 3A-3D shows a different graphical user interfaces showing the presentation of the stimulus I to user U, with FIG. 3A showing a stimulus video player as of step S25 that can present different hypothetical events E to a user U, for example of the topical area of retirement investing, with FIGS. 3B to 3D showing different screen shots of the hypothetical events, showing a hypothetical event E involving grandchildren (FIG. 3B), a hypothetical event E involving retirement activities and vacation (FIG. 3C), and hypothetical event E involving an unforeseen change in the financial planning that is presented by a financial advisor (FIG. 3D)
Figure 3B:
Figure 3C:
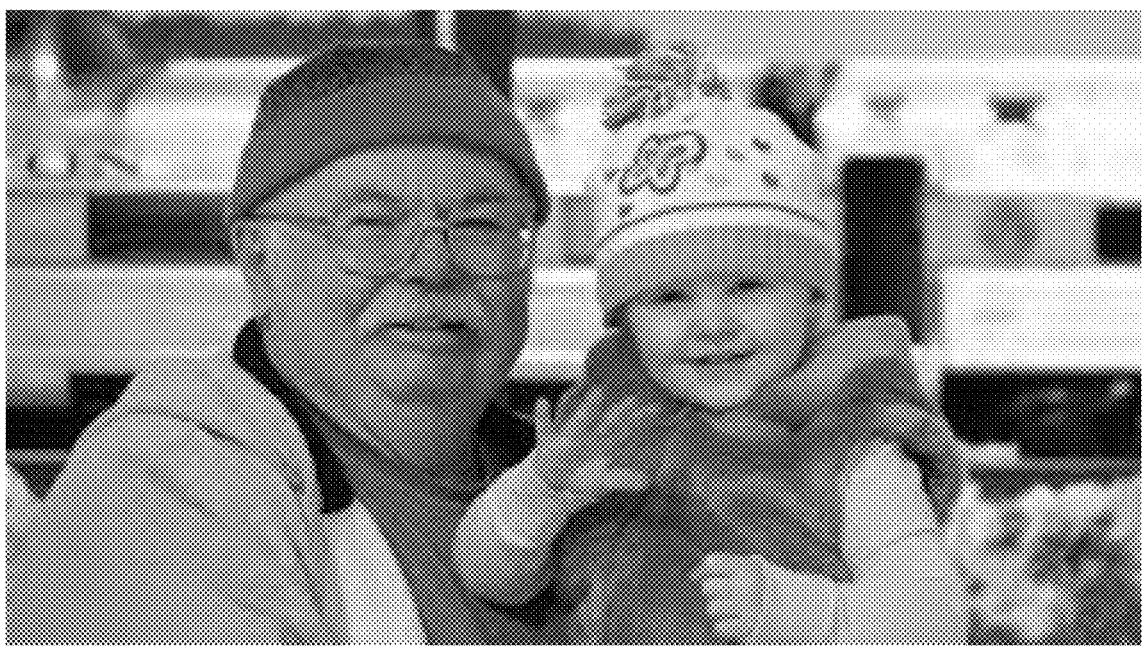
Figure 3D:

With step S25 of the stimulus player, this operational step can expose user U or otherwise subjected user U to a chosen stimulus I from step S05 for a time period TP, as explained above. For example, stimulus I can be but is not limited to an audiovisual presentation presented during a time period TP that includes content describing the hypothetical or actual event E related to different topical areas TA, for a specific application A, or partial events E that could potentially lead to the event of a topical area TA, for example by playing an audio-visual presentation on with the visual element computer screen 10 and audio element speakers 12 of computer device 15. In step S25, as an example, the stimulus I is presented to the user U in the form of a video presentation with an audio narration that describes one or more events E user U, the events related to a topical area TA, the audio narration being supported by video clips and images, as shown exemplarily in FIGS. 3B-3D, for example in the way of hypothetical events, probable future occurrences, and happenings, and at the same time, visual presentations are shown to the user U by a video that is presented on a display screen 10 and audio is emitted by speakers 12, the video presentation being such that it can evoke different feelings related to the events and happenings to the user U. For example, this can be done by describing a hypothetical event or scenario to user U in personalized way, by a narrating voice and associated video sequences, using the first given name of the user U, making user U feel that this could actually happen to him or her, such that he is projected into the described scenario, with the goal to evoke a subconscious or conscious emotional response that manifests in various facial expressions of the user.

For example, in the field or application A of analyzing the user for his emotional suitability for different types of investment portfolios, the stimulus I can include a plurality of topical areas TA including but not limited to interest in short-term cash flow, interest in long-term investment portfolio, interest in financial safety for family and children, interest in securing retirement, interest in recommendations of a financial advisor, and interest in a high or low level of financial organization. With FIG. 1C, the stimulus I is schematically shown as a graphical representation of an audio-visual presentation, having a duration of a time period TP, four (4) different time segments that are dedicated to four (4) different topical areas TA1, TA2, TA3, and TA4, and each topical area having at least one event associated thereto, for example TA1 having two events E11 and E12, TA2 having three events E21, E22, and E23, TA3 having two events E31, E32, and topical area TA4 having one event E41.

For example, the stimulus I can include an audio, visual, or audiovisual representation of a possible scenario of a life experience or situation, the possible scenario projecting user U into a real decisional situation. For example, the application A of analyzing or assessing the user U for his suitability for a job or a project, for example in a job candidate evaluation, the stimulus I can include different topical areas TA with respect to conflict between different employees that needs to be handled by user U in a projected setting, a topical area TA with the event E of the user U being a hypothetical team leader requiring a fast and precise decision or reaction, can include topical area TA with the event E of a short deadline stress situation that will require a large amount of overtime over a short time period, and including decisions that have to be made without having the time to verify all facts, can include a topical area TA having an event E where the user U needs to deal with a sudden departure of an important employee of his team.

For example, the application A of analyzing a reaction of a user U to different marketing communication for a product or service, for example a different audio-visual commercials, it is possible that the event E of a topical area TA is simply the presentation of the commercial without any narration, to analyze the emotional reaction of user U on the commercial, free from human bias. This allows to see if a desired emotional reaction of user U is achieved, which can be used as a statistical data for peers that belong to a population group represented by user U.

Next, at the same time, while the stimulus I is presented to user U in step S25, a signal UI is recorded in a step S15 by user image recorder, for example video of the user U by an image capturing device, for example camera device 25 of the computer device 15. It is also possible that the signal includes an audio recording of an area where the user U is present that is recorded by microphone 27, for example to capture audible emotional reactions. The signal that is recorded of the user, for example the recording of image or video is such that while the stimulus I is presented to the user U, for example the video presentation, a face or the head of the user U is fully recorded during the presentation of the stimulus I. This allows step S15 to capture or records a signal of user U during which user U reacts on the stimulus I, in the form of user images UI. This can be supported by step S20 in which a distraction detection algorithm is performed to detect a degree of distraction of user U. Distraction detection algorithm S20 can be performed in parallel with the recording by step S15, and can analyze the received images from step S15 to see if user U is being distracted. This algorithm is shown in more detail in FIG. 1D, and further discussed below.

In parallel to, or partially in parallel to, or after performance of step S25 of playing or otherwise performing stimulus I to user U, and S15 of recording or capturing user U with user images UI, a step S30 can be performed, in which the captured signal of user U is filtered to remove images in which distractions of the user U have been detected, to take into whether user U is actually paying attention, concentrating or looking at stimulus I, to generate a normalized signal of user U, based on the results of step S20.

For this step S30, a signal from the distraction detection algorithm S20 is provided to step S30, being a signal indicative of a level of attention or a level of distraction of user U for a given time moment, or given image frame or video sequence of user images UI, while stimulus is playing. As a detection of an emotional reaction by user U may be of little value if it is not the results of the focus on stimulus I by user U, it is necessary to analyze the user U, independently from the other algorithms, to see to what degree he or she is paying attention to stimulus, with step S20. This can be done by different biometrical algorithm analyzing an eye position or viewing direction of user U, to see if user is looking at display screen 10, to verify if his eyes are closed, or to simply verify whether the user U is present in front of the display screen, and can generate an attention or distraction detection signal or value. The algorithm is described in more detail below with respect to FIG. 1D. This allows to generate a signal value from 0 to 1, for 0 meaning that the user U is not present or not at all looking at stimulus I, and 1 meaning that the user U is fully concentrating on stimulus I. This signal can be forwarded to the step S30 to filter the distractions from the recorded images of user U.

Also, the recorded images UI from step S15 of user image recording are provided to step S30. To match images UI to stimulus I, both inputs are timestamped. This allows to have an exact time reference or link between an image or image sequence of stimulus I that was presented to user U, and the corresponding an image or image sequence of the recorded images UI. The timestamp can be metadata such as a sequence of characters or encoded information identifying when a certain event occurred, usually giving date and exact time of the day. Step S30 can also include additional filters, for example to remove noise from the image data signals, or remove parasitic effects.

Next, after performing step S30 where the distractions are filtered from the images or video UI of user U, the thus processed images of user U are forwarded to a step S35, in which a face and emotion analysis of the images of user can be performed, by the face and emotion features extractor. A result of this step is a recognition of emotions of the user U, based on his facial expressions, or facial expression features, specifically facial expression features that are subconsciously driven by the brain of user U. This step is further shown in more detail in FIG. 1E, and with an alternative embodiment in FIG. 1G, and is further discussed below. In step S35, different aspects of the non-verbal expressions of the user U as recorded on the image signal can be detected. In this step S35, the signal captured or recorded of user U of step S15, is analyzed by a computer algorithm to determine different aspects of the immediate expressions of the user U, to determine the non-verbal communication expressed by user U while watching or otherwise being subjected or exposed to the stimulus I, the non-verbal communication features having been caused by user U being subject to the stimulus I.

For example, the UI signal from step S15 is provided to step S35, after filtering distractions in step S30 can be analyzed for detection of physiognomical expressions of the user U in each image of a sequence of images, for example but not limited to facial expressions, facial movements, eye movements, and by comparing the UI signal frame-by-fame. As an example, this can be done by tracking a plurality of facial points of a plurality of facial muscles. Thereby, for the computer algorithm of step S35, image processing algorithms are used to detect emotional expression features of user U in the recorded user images UI, for example different categories of physiognomical expressions of the face of user U. For example, with step S35, it is possible that one-hundred and seventy (170) different facial tracking points are tracked and analyzed, to determine and calculate features of forty-three (43) different facial muscles, to further determine different immediate physiognomical features of user U, from the recording of user U in step S15. The movement of the facial muscles lead to a large variety of facial expressions, and the different movements of the facial muscles is captured, compared to a computer model, and quantified. These immediate physiognomical features of user U are expressions of immediate emotional responses of user U that are represented by micro-expressions subconsciously performed by user U, before his rational brain activity has processed the information of stimulus I and has conveyed the emotional response that the user U wishes to express.

A human being, such as user U, subconsciously expresses emotions with his face when feeling such emotions within the brain activity. Certain emotions are expressed within a short time period after or in parallel with the brain activity, and cannot or can only limitedly be controlled consciously by user U. This response happens extremely fast, with information reaching the pons, e.g. part of hindbrain, within 100 ms to 300 ms and the full startle reflex occurring in less than 500 ms. These emotions are expressed by muscle movements of the facial muscles that are controlled by the human brain, including two parts of the brain, (i) the amygdala that manages the human emotions, and (ii) the hippocampus that registers long-term memories, and the expression of the emotions is a combined action between the amygdala and the hippocampus of the human brain. These muscles movements lead to different types of facial expressions that represent different emotions. In the face of a human being, the main facial elements that express emotions are the mouth and its position and expression, the eyes, and the eyebrows. However, additional micro-expressions are also performed by the face of a human being. With step S35, these facial expressions can be captured, tracked, mapped to a model of the face, and features are detected, to provide for a set of facial expression features. Assuming a recording frame rate of twenty-five (25) images per second in step S15 for user images UI, thereby a duration between two recorded images will be 40 ms. This signifies that twelve (12) images for UI will be recorded within the time period of 500 ms and are useable for emotion detection by step S35. Upon triggering a subconscious emotion of user U who is viewing or otherwise experiencing stimulus I, it is possible with step S35 to extract features of subconscious emotions that are expressed by user U based on the images captured within the 500 ms time period. This time period is short enough that the user U cannot consciously suppress these emotions, for example mental training. Of course, other frame rates for recording user images UI can be used, in which more images will be available within the time period of 500 ms. The computer algorithm uses both a local view approach and a holistic view approach of the face of the user U to capture, track and detect the features of the face of the user U, by a deep learning that has been previously performed. These features are mapped to a model, or normalized relative to a model, for example the FACS. The local view detects features related to isolated expressions like the smiling mouth, squinting eyes, etc. while the holistic view takes into account the combination of such features, and the entire action of the muscles in the face.

Step S35 can use different types of computer algorithms to determine the facial expression features. For example, step S35 can be performed by a convolutional neural network (CNN), for example the first CNN that has been trained based on exemplary individuals that were expressing an emotion, that have been rated and quantified based on FACS. An exemplary architecture variant of the first CNN 5C is shown in FIG. 1F in generic way. The normalized signal and the attention detection signal are inputted to the CNN 5C. The CNN can be trained by using a large quantity of test videos of people that are expressing subconscious emotions that can be attributed to different distinct events, by a deep learning process. For example, the CNN can be trained with digital images and sequences thereof as shown in U.S. Patent Publication No. 2016/0259994, this reference herewith incorporated by references in its entirety.

As of another example, other types of artificial intelligence calculations can be used, for example image classification algorithms that use random forests and ferns. In this respect, random forest can be trained to detect emotions, as shown in Matteo Sorci, "Automatic face analysis in static and dynamic environments," Ph.D. dissertation, EPFL, presented Apr. 24, 2009, Thesis No. 4357, this reference herewith incorporated by reference by its entirety. Other possible technologies for machine learning to perform step S35 can be based on support vector machine (SVM), Bayesian Networks and Ensemble Learning.

Next, in step S40 of emotion analysis, the facial expression features that are gathered from step S35 that describe different physiognomical features of the user U are analyzed to be interpreted and associated based on a set of emotional factors EF or an emotional fluence profile EFP by another computer algorithm. For example, in step S40, the facial expression features of step S35 can be weighed, as a function of time, to be associated to the seven (7) emotional factors EF including anger, fear, disgust, happiness, sadness, surprise, and neutral expression. It is also possible that other emotional factors are used. With this computer algorithm of step S40, the different physiognomical features over time of user U are weighted and associated to one or more emotional factors EF along a timeline of the duration TP of the presentation of stimulus I, in the variant shown to output a vector with seven (7) data values for each time moment. The timely evolution of the different EF over the duration TP of the presentation of the stimulus I to user U, being time period TP, defines the emotional fluence profile EFP, as shown exemplarily in FIG. 5A, for the factor "happiness." Generally, the EF are represented as absolute values for indicating an intensity of the currently expressed subconscious feeling of the user U.

In an example, this computer algorithm can use a second convolutional neural network CNN that is capable of analyzing the detected features of face of user U, and assign them, in a weighted fashion, to a set of emotional factors EF, over the time period TP corresponding to the presentation time of stimulus I. As a result of step S40, an emotional fluence profile EFP for each one of the EF over time can be generated by the computer algorithm, in the example a CNN. The emotional fluence profile EFP shows for user U, for the different emotional factors EF, an emotional state of mind of the user at a given time instant while being subjected to the stimulus I during the time period TP of recorded user video UI. For example, for each emotional factor EF over the time period TP, a curve can be generated indicating an intensity rating of each emotional factor EF for a specific time moment, for example from the value zero (0) indicating the lowest level of the specific ET, and a value one (1) representing the highest level of the specific ET experienced by the user U at the specific time moment. An exemplary architecture for the second CNN is given by FIG. 1F.

As another example, instead of using a CNN, other artificial intelligence algorithms can be used, to determine the emotional fluence profile EFP over a time period TP based on a time-variable facial expression features of step S35, for example different types of machine learning architectures, such as random decision forest. For example, random forest can be trained to establish a link and weighting between facial expression features and the emotional fluence profile EFP. As mentioned above, other possible technologies for machine learning to perform step S40 can be based on support vector machine (SVM), Bayesian Networks and Ensemble Learning.

Next, in a step S45, the emotional factors EF and the emotional fluence profile EFP that results from the step S40 of emotion analytics is subject to another computer algorithm, in which emotional factors EF and the emotional fluence profile EFP is subject to a correlation with the plurality of topical areas TA that were presented by the stimulus I, for example with one or more events E as schematically shown in FIG. 1C, by a computer algorithm. This is exemplarily shown in FIG. 5B, where six (6) different topical areas of application A are each associated with a rating value, in the variant shown an absolute rating value, for example a value between zero (0) indicating a lowest possible interest or emotional reaction, and a value one (1) indicating a highest possible interest or emotional reaction. Next, a relative category rating CR or ranking value for each topical area TA can be made, as shown in FIGS. 5C and 5D. The calculation or determination of the category ranking or rating CR in step S45 for each topical area TA takes the emotional fluence profile EFP of the several EF factors into account. This computer algorithm can also be based on historic data of other users, and as explained further below, based on the classification of the user U, for example his classification into one of a set of different thinking types.

Figure 5A:
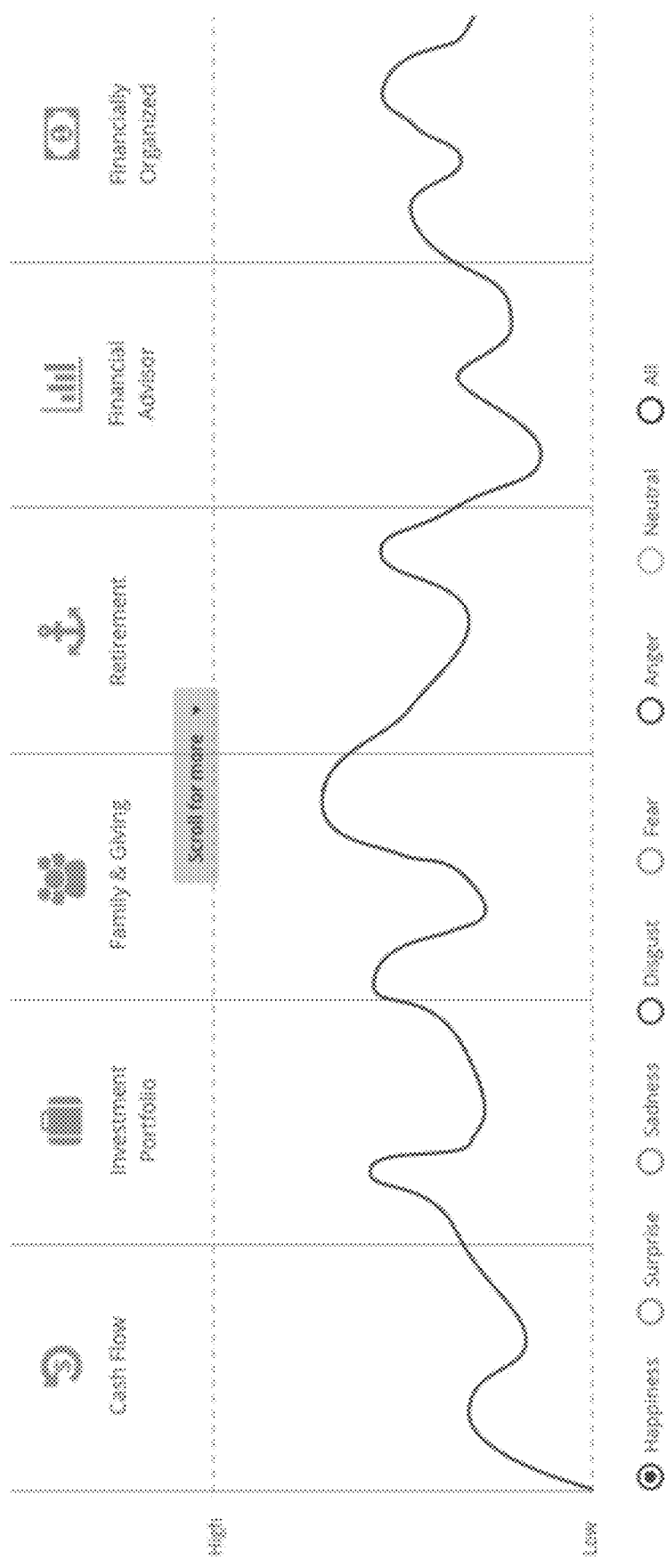

In the computer algorithm for determining the EF, a weighing process can be performed, in which at the beginning of a first time period, corresponding to the beginning of the presentation of the first topical area TA, a reference value for the specific EF is determined based on the time-dependent fluence value, is calculated. Next, an average is generated over a plurality of sampling time periods, the sampling time periods lying with the first time period during which the first topical area TA is presented to user U. Next, for the first time period, a variance value is calculated of the EF factor, taking the reference value as a base. Thereafter, all the values of the sampling time periods are summed and multiplied by a weighting factor to determine the EF of the first topical area, exemplary results are shown in FIG. 5A. This algorithm is repeated for each topical area TA, for the time period of the duration of the presentation of the topical area TA to user with stimulus I.

Next, the individual EF values representing absolute values for the emotional reaction to the different topical areas TA can be compared to determine the relative importance of the topical areas TA to user U, to show the user U which topical area TA is of the highest and of the lowest interest or concern to her or him. These scores are exemplarily shown in FIGS. 5B and 5C.

Another factor that can be taken into account in step S45 is the thinking style category of user U, that may or may not have been determined in step S05. This allows to further weigh, filter, or interpret the emotional factors EF or emotional fluence profile EFP, before making a determination of the category rating or ranking CR. For example, for a more emotional thinking archetype or classification, the "experimental self" will be compared and normalized to results of peers of the "experimental self" group of subjects, while a less emotional thinking archetype or classification, being the "safekeeping self," can be compared to individuals to the same group. For example, this allows to multiply or weigh the emotion factor EF with a thinking style correction value CV or correction function, to ultimately determine a category rating or ranking CR that takes different groups or sets of user U and their different thinking styles into account.

The determination of the weighting factor or correction value CV based on the thinking style of user U determined in step S05, and can be made by analyzing a large group of individuals that have been determined to be part of the same thinking type or style on their emotional factors EF or EFP of the different topical areas TA by a stimulus I, and by comparing the results of the same topical areas TA with user being part of the other thinking types. The allows to determine a ratio of difference between the different thinking types, that can serve as the CV, or as a basis for the CV. In this respect, the thinking style correction value CV or correction function can normalize the different EF or EFP for users of the different thinking type groups. For example, the EF values for a group of users U that are associated with a specific thinking style can be analyzed to determine the mean score, median score, or most often occurred score that can be used as a thinking style correction value CV to determine a thinking style normalized EF or EFP, and thereafter a thinking style normalized CR. Also, this determination of the CV can be made dependent on a variance of the different EF values within a group of users of a specific thinking style. For example, a correction value CV can be set to the value one (1), i.e. signifying no normalization based on thinking styles, if the variance of the different EF samples is too high, i.e. exceeds a certain threshold. See for example David C. Howell, "Statistics in Psychology," 8th Edition, University of Vermont, Wadsworth Cengage Learning Publication, 2013, ISBN-13 978-1-111-83548-4, this publication herewith incorporated by reference in its entirety.

Another usage of the combination of the thinking style with the emotion fluence profile EFP is to learn how EFP patterns for different TAs given a certain thinking style can be mapped to certain attitude to actions or triggers to create personalized suggestions based on the combination of different thinking styles, emotion factors EF and their temporal development by the EPF, and the respective topical areas TA. For instance, considering a Doctor Spock type of thinking style profile. Spock is the type of character that represents the quintessential of "blue-earth" thinker: left-brained and concrete, basically concentrates on fact and logic. Based on his profile and his particular EFP pattern displayed for a certain TA, the system will be able to suggest a suitable action, i.e. action aiming to a long-term profit based on the history of facts on his next investment. On the other hand, Captain Kirk, who represents a "red-earth" thinker is an "action type" person, not deep-thinking specialist and lead by intuition, will receive different suggestion given the same type of displayed EFP pattern on the same TA, i.e. fast turn-around on the next investment based on current facts.

Figure 5B:
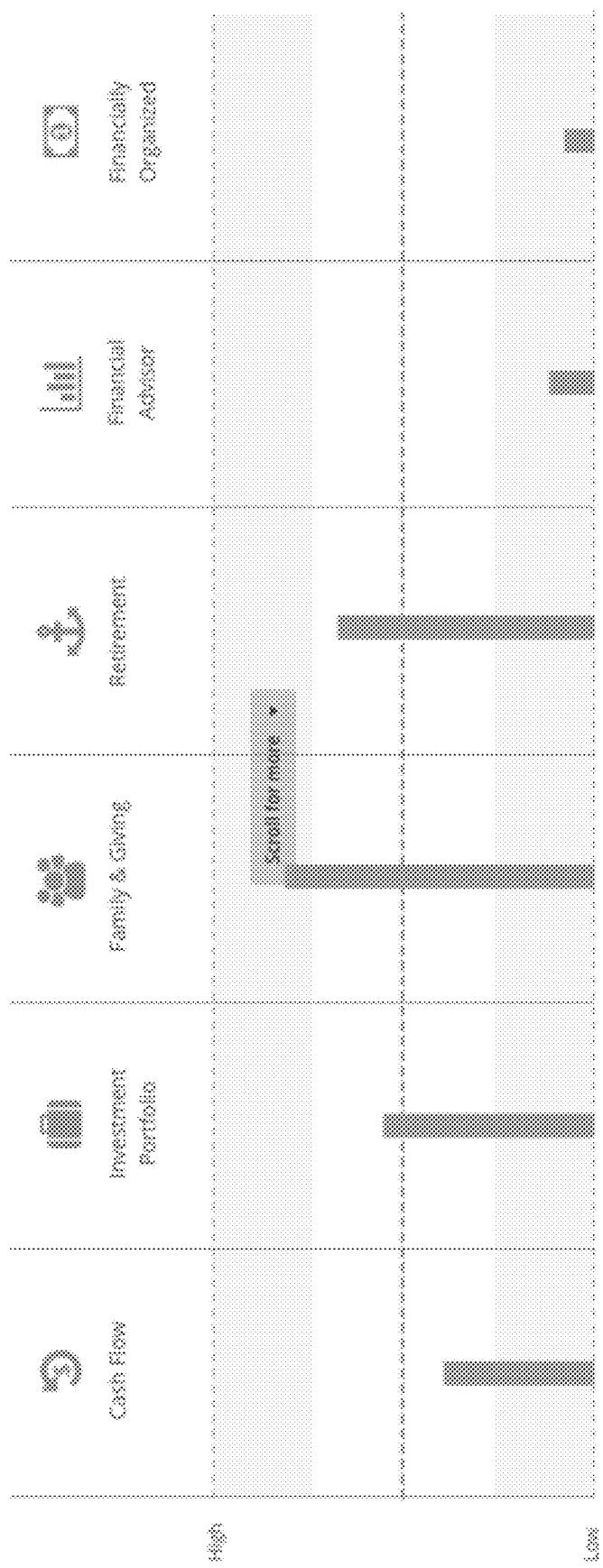
Figures 5E, 5F:

As shown in the exemplary graphical user interface of FIG. 5B showing a report, the different values for each topical area TA is qualitatively shown as a vertical bar reaching different heights or amplitudes, ranging from a low interest to a high interest, representing an absolute interest intensity value. With this graphical user interface that shows each score for six (6) exemplary topical areas TA, the user U or operator O can readily see which topical area created the strongest reaction. Also, it also possible to show the comparative values of the scores of a spouse, as a comparative category rating or ranking CR in a chart or other graphical representation. In the exemplary graphical user interface of FIGS. 5E and 5F, the scores are shown as relative numerical values for all topical areas T, as a ranking. Also, the ranking for the peers of the user U can be displayed for comparison purposes. In FIG. 5F, the raking scores and the absolute value of the score shown as a horizontal bar are shown associated with the topical area TA.

Next, in a step S50, a report is generated for user U, based on the category rating CR. The report can be presented in various form to user U, or another person who operates or is otherwise in control of method 100, for example but not limited to as a priority list that is displayed in a graphical user interface on computer 15, is prepared as an electronic document and sent via email to the user U, is made available via a webpage of the operator, can be printed on paper as a printed report. The report can also include the emotional fluence profile EPF and a timeline thereof with association to the different events or topical areas of the stimulus I, as exemplarily shown in FIG. 5A, can include the absolute values of the category ranking CR as shown in FIG. 5B, and can include the category ranking CR as scores as shown in FIGS. 5E and 5F. Also, the report can include a behavioral profile of the user, that can be determined by an algorithm, logic, for example to associate the CR of the user to one of a plurality of different pre-stored behavioral profiles. For example, different behavioral profiles that have been generated by expert data and historical data of a variety of different personalities can be created, and associated with corresponding ranges of the CR. This allows to rapidly determine a specific behavioral profile of the user U, based on simple comparisons of the values of the CR with the ranges of the corresponding pre-stored behavioral profiles. In this step, a structured data format document can be created, for example but not limited to a portable document format (PDF) file or an extended markup language (XML) file can be generated with the information on the user, including the EFP and the category rating CR.

Next, in a step S55, the report can be outputted to a different entity or made available to user U, operator O, or a third party. For example, the report can be made available to the user U, operator O, or another third party, for example by generating a file that is sent to user U or to operator O. For example, the data can be provided as an XML file and be sent per email service to operator O. As another example, the report can be structured as a website with access rights to the operator. Reports can be archived as a data structure that and saved in database or hard drive 50 for additional data processing and storage. For example, statistical analysis can be performed on the archived data. It is also possible that a printed report is sent to a user U or operated via regular mail.

In an additional step of the method, for example a step that is performed before the user U subjects himself to the stimulus I and his reactions are recorded, in steps S15 and S25, the user U can be evaluated to generate behavioral assessment for the application A. This can be done by a questionnaire that is presented to him via a graphical user interface of display device 10, for example by directly asking user U one or more questions related to one or more events of a topical area TA. For example, in the field of emotional profiling of a user U for financial investments, the user can be asked questions regarding his personal importance or ranking of each topical area TA, or by asking questions related to events of the topical area TA, for example as exemplarily shown in FIGS. 5C and 5D. In this process, it is possible to visualize the importance or rankings of peers, the peers being defined as other potential users being in at least one of the same income category, wealth category, job sector, age group, gender, family situation including marital status and number of children. This allows to establish and record a first behavioral assessment of the user U that does not take into account the results of method 100 and system 200, for comparison purposes.

Figure 1D:
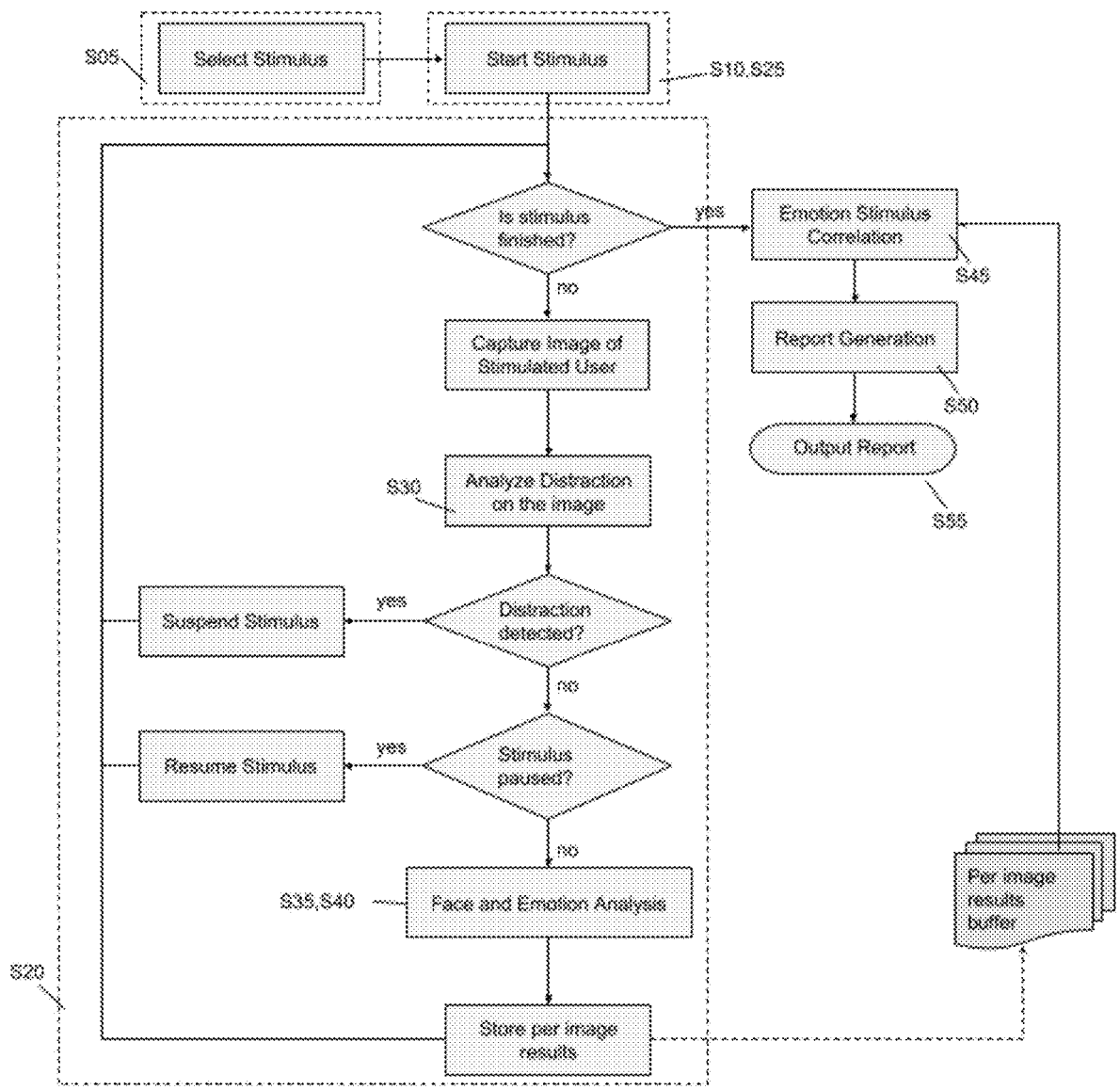

FIG. 1D shows an exemplary flowchart on a time-dependent base and the logic connections of parts of method 100, showing an alternative view of method 100 as compared to FIG. 1B. For example, for the data processing of step S20 in which the user video UI is analyzed to detect whether, at a specific time instance, the user U is distracted, i.e. whether the user U is paying attention to the presented stimulus I or not. In this step, an image is captured from the user video UI and is analyzed for distraction by an algorithm. For example, the distraction can be detected by detecting a presence of a face in the captured image, as discussed above with respect to step S353. As an example, image processing technology can be used that detects a gaze, for example as shown in U.S. Patent Publication No. 2014/0055342, this reference herewith incorporated by reference in its entirety. Also, technology that is used in the automotive sector for detecting whether a driver of a vehicle is distracted based on image processing can be used, as exemplary described in U.S. Patent Publication No. 2007/0159344, this reference herewith incorporated by reference in its entirety.

The algorithm starts with the playing of the stimulus I to the user with step S25, and the recording of video of user U to record the user video UI. Upon the detection of a distraction, for example upon detection that a probability of the user U being distracted from stimulus I, the playback of stimulus I can be suspended or paused. If no distraction is detected, and the stimulus I is paused, the algorithm can resume the playing of stimulus I to user U. The algorithm also includes a step of raw image processing of the recorded images. For example, each image of the user U in the user video UI can be annotated or metadata can be provided to include a level or probability of user attention to stimulus I, for later processing of such information, for example for statistical analysis of the emotional factors EF.

Figure 1E:
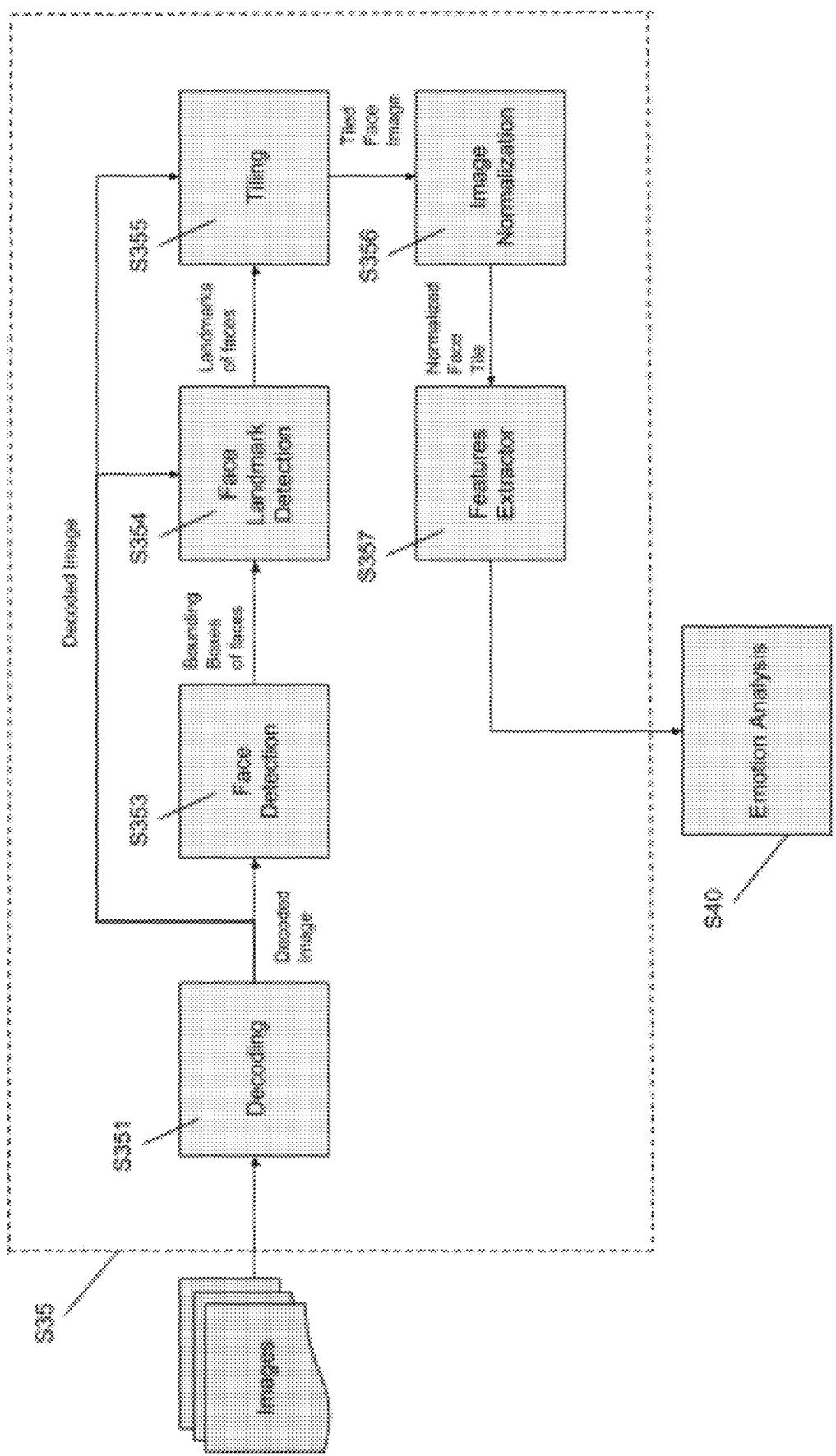
Figure 1F:
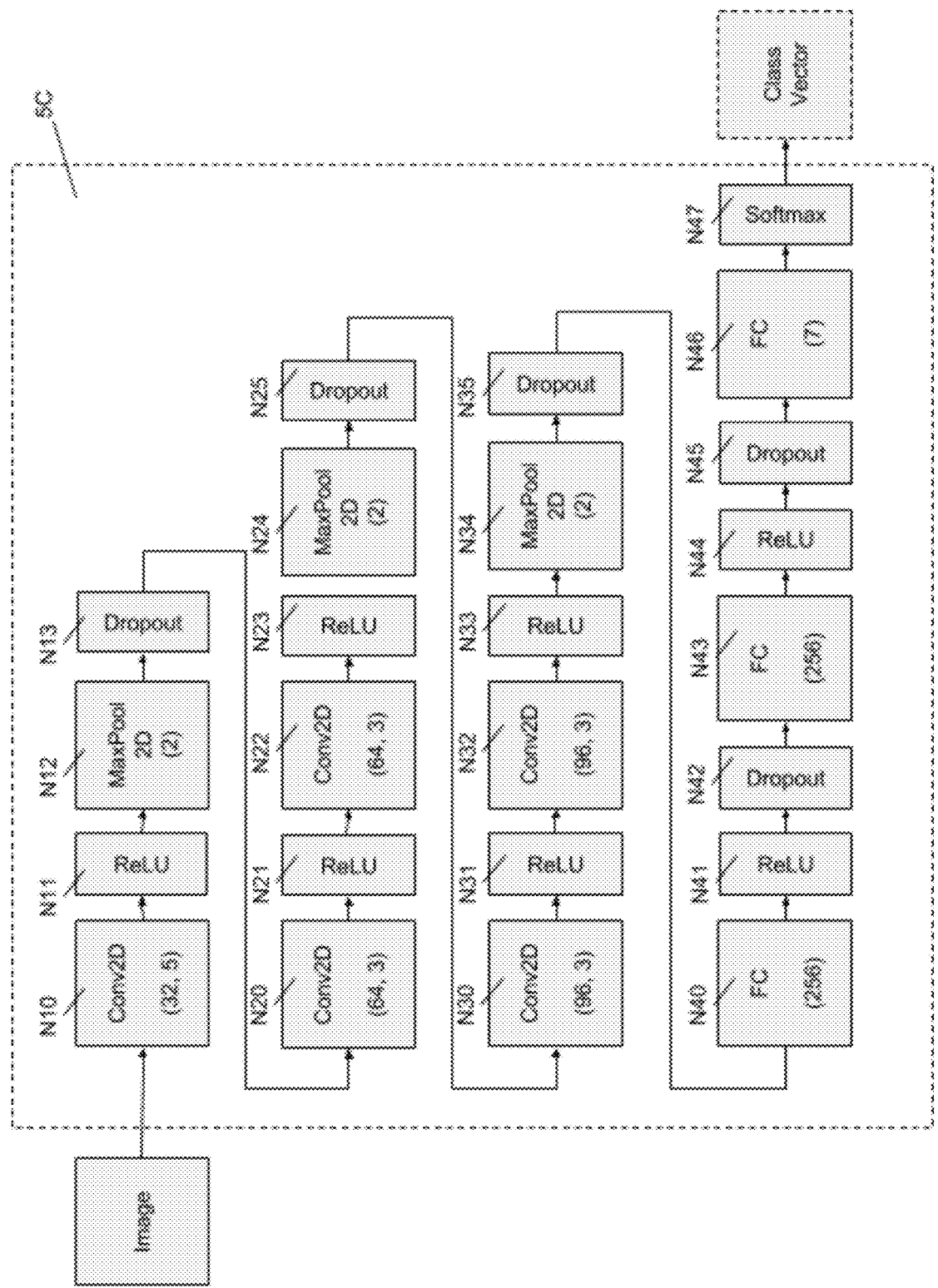

FIG. 1E shows an exemplary flowchart for the data processing of step S35 in which the emotions of the user U from the user video UI are detected, with the face and emotion features extractor. This step S35 can include a first step S351 of decoding the input image data to a desired format, for example to decompress the images from user video sequence UI to a raw file format or other more convenient data format to facilitate further data processing. Next, a step S353 is performed in which a face detection algorithm is applied to the individual images, to detect the outer boundaries of the face of user U in each image. As a non-limiting example, a face detection algorithm as shown in U.S. Pat. No. 6,661,907 can be used, these references herewith incorporated by reference in their entirety. As another example, a CNN can be used as exemplarily shown in FIG. 1F, that has been trained with faces of different positions and sizes with the goal to determine whether a face is present, and to extract a region or boundary box of the face.

A result of this step S353 are the image coordinates or other definition of a boundary box around the face of user U, to avoid further data processing on information that is not usable for the emotional analysis of the face. This allows to substantially reduce the amount of data to be processed.

Next, the boundary boxes of the face of user U, and the raw image data from step S351 are subjected to a step S354 to perform a face landmark detection. This step allows to detect points in the image that define the face, for example but not limited to the corners of the mouth, the coordinate points that define the face, position of the eyebrows relative to the eyes, dimensions of the nose, mouth, etc. In this processing step, a landmark vector is generated that can include, in a non-limiting example sixty-eight (68) points that describe the face of the user and its features. For example, for the face landmark detection, a data processing can be done based on computer vision that uses the active appearance models, for example as shown in U.S. Patent Publication Nos. 2005/0169536 and 2010/0013832, these references being incorporated by reference in their entirety.

Once the landmarks or landmark vector of the face of user U is detected for a specific image, a tiling, clipping, or windowing step S355 is performed on the raw image data from step S351, where the face of the user U is extracted from the raw image, to reduce the image size, and to make sure that the data content is reduce for further processing. The step of tiling S355, cropping, or windowing uses the boundary box that was found in step S353. This step refines further the boundary box that was determined in step S353 of face detection, using an algorithm. This can be a set of heuristics that allow to generate tiles that are consistent in its rules to cut out a face of different users U. A result of this step is a reduced data image for each frame of the user recording UI. For example, an algorithm that can be used for the face extraction by tiling as shown in U.S. Pat. No. 7,324,670, this reference being herewith incorporated by reference in its entirety.

Next, the tiled image is subject to a step S356 of face image normalization. Generally, this step S356 has the goal to establish a digital view of the face of user U that eliminates any non-uniformity that is not part of the distinctiveness of the different faces of the different users U, for example influences and noise on the image that are a result of environmental factors and face orientation. For example, the tiled images can be subject to an illumination equalization that is histogram-based, as shown in U.S. Patent Publication No. 2005/0013479, this reference herewith incorporated by references in its entirety.

Optionally, the tiled image can be subjected to further normalization processes, for example a geometric normalization including reprojection to fit a reference viewpoint, for example formalization of the face of the user, a geometric reorientation of the face of the user with respect to a viewpoint that is straight in front of the face of the user, size scaling, light exposure normalization, and color uniformization. For example, the face of the user U in the image tile can be frontalized as shown in International Patent Application PCT/US2016/015181, this reference herewith incorporated by reference in its entirety. As another example, in step S356 of face image normalization, the image tiles can be further processed by an image processing algorithm to compensate for low lighting or overexposed portions of the face of user U, to increase or decrease resolution by an up-sampling or down-sampling algorithm for example with the goal to provide for a specific resolution that facilitates further data processing, compensate for motion blur, to provide for focus from out-of-focus images, compensate and back-project a face of the user during head movements, take account of a facial occlusions and obstructions, for example glasses or facial hair, detect self-occlusions for example by hand movements, garment, hair, etc. For example, facial occlusions could be processed to be synthesized for additional data processing, as shown in U.S. Pat. No. 8,571,272, this reference herewith incorporated by reference in its entirety.

Once the step S356 is performed, the images can be analyzed by step S357 of feature extraction, as described above with respect to FIG. 1F showing an exemplary CNN 5C and with step S35 discussed above. As an example, for the feature extraction algorithm, the algorithm or a similar algorithm of U.S. Pat. Nos. 5,905,807 and 6,526,161 can be used, these references being herewith incorporated by reference in their entirety.

FIG. 1F shows an exemplary view of the CNN that can be used in different steps of the method, for example in step S40 of the emotional analysis of method 100. In this step of the method, the emotion or user U is analyzed and detected, for each pre-processed image. Emotion detection is performed on pre-processed grayscale frontalized tiles from steps S355 and S356 using a CNN 5C that classifies the image in one of the seven (7) emotional states or factors, as discussed above and as shown in FIG. 5A. The network 5C can accept images with a single channel and variable width and height. In the example, the pixel values are expected to be 32-bit floating point values in the range [−1, +1]. Also, in this example, the output of the network is a seven (7) entries vector of the emotional factors, each entry corresponds to one emotional state, including happiness, surprise, sadness, disgust, fear, anger, and neutral. The network 5C returns the emotional state corresponding to the entry with the highest value as the detected class for a given image from the recorded user UI.

The CNN used by system 200 or method 100 requires a set of parameters to operate. These parameters are generated during a system development phase using a procedure called training and are not changed during the operation of the system, as schematically shown in FIG. 1H. The procedure takes as input a large set of example pictures of people displaying all different emotions, for example at a thousand (1000) different example images or image sequences covering each one of the seven (7) emotional factors EF including anger, fear, disgust, happiness, sadness, surprise, and the neutral expression with annotations or metadata that has been made by an expert with the emotion identified in each picture. It is also possible to use many more sample images or sample image sequences. For example, for annotating the training sequences, the FACS scheme can be used. The training procedure uses an optimization algorithm that iteratively searches for a set of parameters of the CNN that, when used with the CNN to classify the example pictures does a small number of errors.

In this example, the network 5C is used as a CNN, being a sequential network. During training, the network 5C includes the following layers: A 2D convolutional layer with 32 filters with kernel size 5 and padding valid N10, a reLU activation layer N11, a 2D max pooling layer with pool of size 2 and padding same N12, a dropout layer with parameter 0.5 N13, a convolutional layer with 64 filters with kernel size 3 and padding valid N20, a reLU activation layer N21, a 2D convolutional layer with 64 filters with kernel size 3 and padding valid N22, a reLU activation layer N23, a 2D max pooling layer with pool of size 2 and padding same N24, a dropout layer with parameter 0.5 N25, a 2D convolutional layer with 96 filters with kernel size 3 and padding valid N30, a reLU activation layer N31, a 2D convolutional layer with 96 filters with kernel size 3 and padding valid N32, a reLU activation layer N33, a 2D max pooling layer with pool of size 2 and padding same N34, a dropout layer with parameter 0.5 N35, a fully connected layer with 256 neurons N40, a reLU activation layer N41, a dropout layer with parameter 0.5 N42, a fully connected layer with 256 neurons N43, a reLU activation layer N44, a dropout layer with parameter 0.5 N45, a fully connected layer with 7 neurons N46, and a softmax activation layer N47.

The training of the network is performed using the Stochastic Gradient Descent Algorithm using a weighted categorical cross entropy loss function. The learning rate (0.01), momentum (0.9) and decay (5e-6) are manually tuned for the dataset. The batch size is set to 128. The optimization algorithm is set to apply the Nesterov's momentum optimization. The number of epochs depends on the dataset. It is decided by running the algorithm while monitoring the accuracy of the model on a validation dataset. When the validation accuracy starts to increase significantly training is aborted. The model with lowest validation accuracy is selected as final model.

For training the network 5C, sample images of the faces a variety of individuals having a specific emotional expression is used. This emotional expression is quantified and added to the image as metadata, for example by using a specific norm. In an example, the facial action coding system (FACS) is used as metadata that describes the facial expressions and the underlying emotions for the specific image of an individual, so that the network can be trained to associate a specific facial expression to a specific emotional feeling, for example a multifactor rating of the seven (7) emotional factors described above.

The training samples batches of an epoch are generated by dividing a stream of samples generated by the following optimization algorithm:

for x in emotional states:
  create set Sx with all the samples with label x
while there exist a Sx that is not empty:
  for x in emotional states:
    if Sx is not empty:
      pick a sample y randomly from Sx
      remove y from Sx
      append y to the stream of samples
    else:
      pick a random training sample with label x
      append y to the stream of samples Before passing a batch to the optimization algorithm the following data augmentation procedure is applied to each sample in the batch: (i) With some probability the image is flipped horizontally, (ii) With some probability a small randomly sized and positioned square of the image is blacked out, (iii) With some probability the image is zoomed or shrunk with random coefficient and it is translated vertically or horizontally by some random offset, and (iv) with some probability a Gaussian blur with random radius is applied to the image.

Figure 1G:
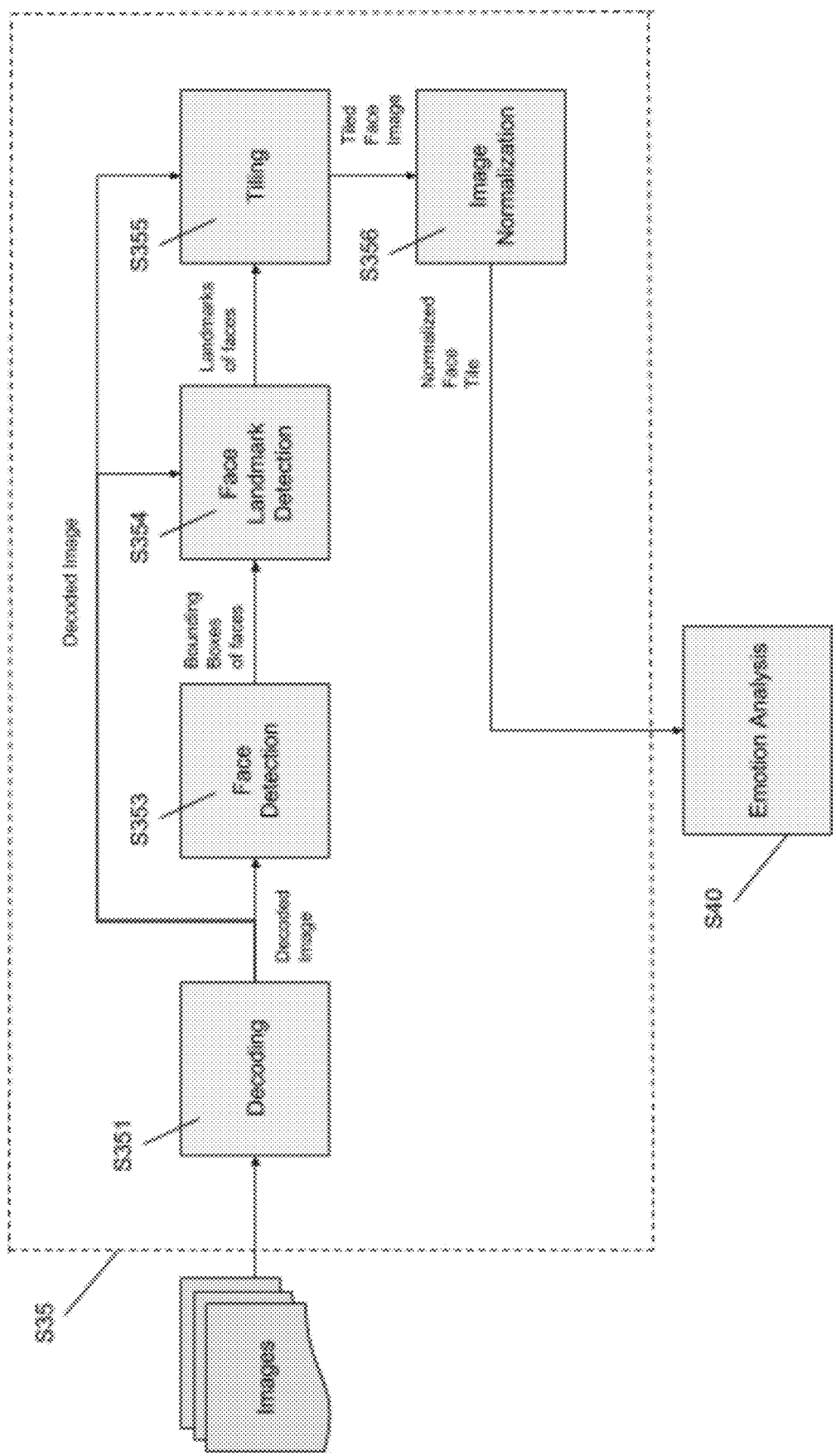
Figure 1H:
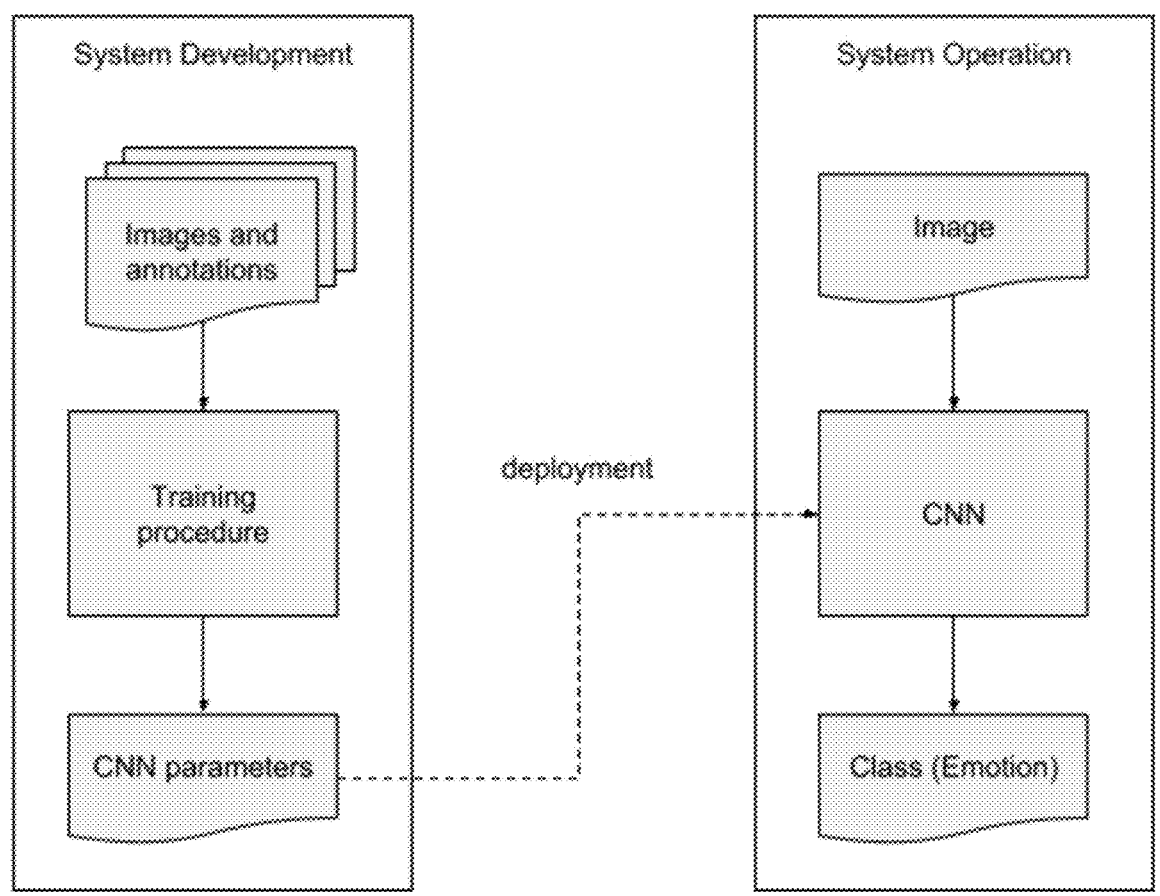
Figure 2:
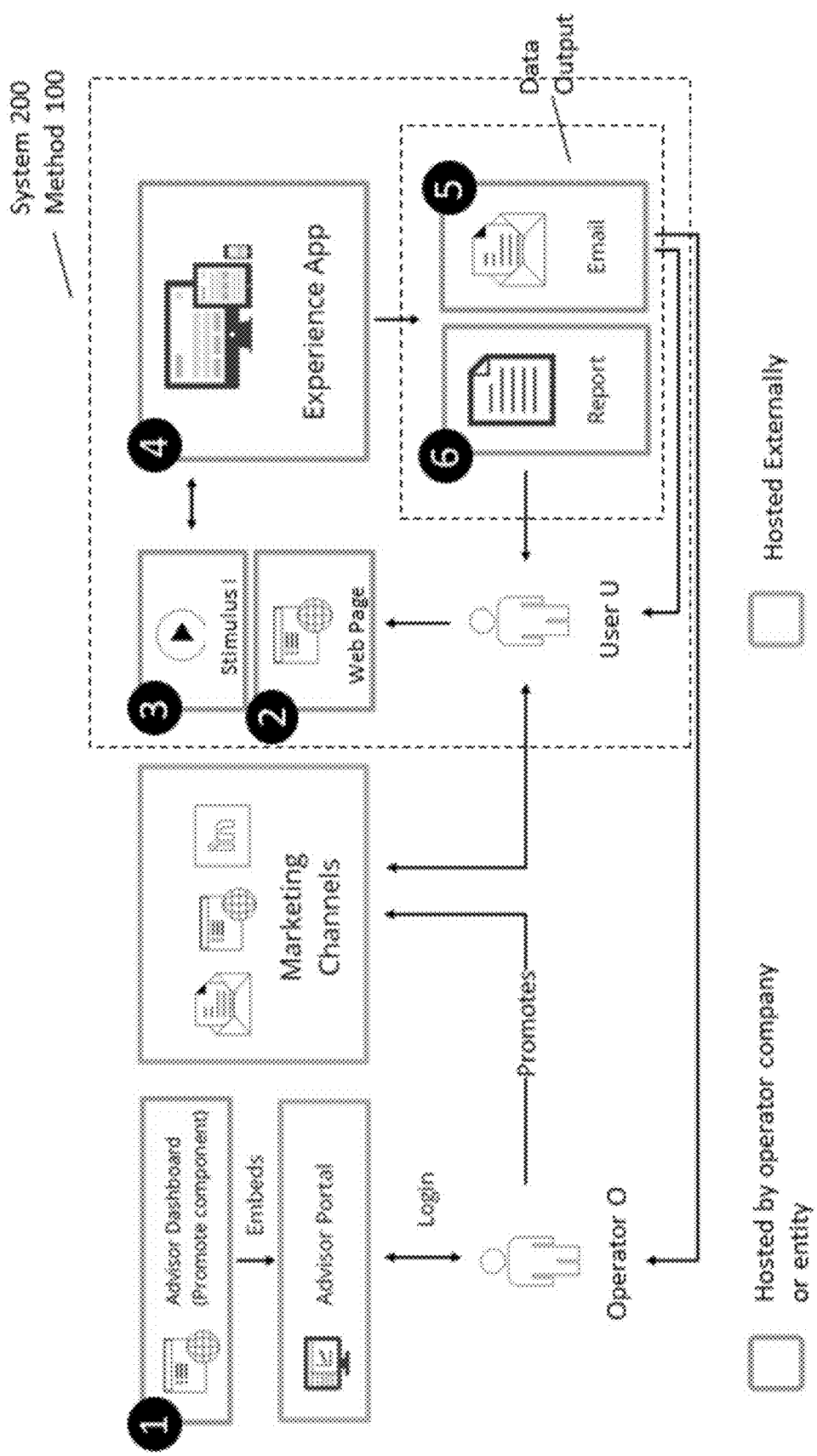
FIG. 2 schematically shows an overview of a computer system 300 for implementing the method 100, according to another aspect of the present invention, where an operator or advisor O can control and instruct a user U to use system 200 or method 100 for assessing his or her suitability, for example for the benefit of an external company or entity, with an advisor dashboard and portal that is operatively connected to system 200.

FIG. 1G shows a variant of the implementation of the step S35 of the face and emotion features extractor, in the case the step S40 emotion analysis has been implemented as a CNN. This means that the input to the step S40 needs to be an image of a face, instead of a features vector. Accordingly, there is no need to perform a step S357 of feature extraction.

In the context of analyzing a potential or current investor or client in financial markets, the present system 200 and method 100 can provide for unique direct benefits to a vast variety of users, helping them set priorities more easily and make more confident financial decisions knowing how they and their families feel about money, common financial issues and risk. By integrating scientifically validated thinking styles, there is a strong correlation with the emotions exhibited by the user being analyzed by the method 100 or system 200. According to some aspects of the present invention, it is possible to assess a behavioral profile of the individual or user U, by performing the automated method 100 with him or her, to make sure a decision on a purchase of a financial asset will have bias, for example no human bias such as a gender-based, racial bias, national origin bias, or bias on social status. Even if a human analyst that is trained for analyzing the behavioral profile of the individual or user U and provides for such assessment, human bias from both the analyst and the individual being analyzed will necessarily be included in the results. Similarly, if a human analysis committee performs such analysis, more human bias can be part of the results.

According to a survey by Nataxis™, one of the biggest challenges for financial advisors is keeping clients invested. Overall, 86% of advisors reported that their success is linked directly to their ability to manage client return expectations, and therefore true knowledge of their expectations is a key feature. But investors globally say they expect returns of 9.5% above inflation, while advisors say expectations for 5.3% above inflation are more realistic. Therefore, it is not a surprise that 85% say their ability to prevent clients from making emotional decisions is a critical success factor and say they are challenged to get an accurate picture of client risk tolerances.

Financial technology ("Fintech") applications are beginning to gain in popularity with users and customers for financial products. For example, the Kasisto™ conversational artificial intelligence platform KAI had been implemented into the Indian digibank and already takes care of 95% of all queries. Making a bank transaction or checking your account state by voice that uses biometric recognition is far more convenient and faster than typing and generating mTAN numbers. Peer to peer lending has taken off due to Fintech. Fintech companies who offer online loans utilize a massive number of data points to determine how likely the borrower is to repay the loan. In addition to direct consumer benefits, financial services businesses can attract new leads and better engage clients with tailored advice based on their emotional response and thinking styles, to important financial, investment and other decisions. Banks can use this technology to position themselves as disruptive innovators and attract new client segments such as millennials that have been very difficult for them to reach and connect with.

In this context, the present system, method and device can complement or replace the traditional "in person" interviews with an inexpensive and fast tool, allowing for a much higher throughput of users or potential clients and can provide for objective results absolutely free of personal bias. It is known that personal interviews are always at least partially subjective based on experience and personality of the interviewer. Moreover, the present system, method and device can provide for a unique direct benefit to different types of users in specific application fields. For example, the system can be used for user or clients looking for the best financial investment, for example but not limited to financial investment portfolios, savings, pension scheme, or users or clients wishing to buy a specific insurance product. Also, the system can be used by financial advisors or financial services companies, such as but not limited to banks, investment services, insurance, and conglomerates of services, so that they can more accurate and scientifically validated methods of understanding human behavior through observation and measuring mental processes of different users, clients, or employees.

First, with the present system, method and device, it is possible to ascertain that the user or the client can be analyzed so that he himself can better understand his true objectives, and a financial manager or advisor of the user can be informed about his true objectives. With the user engaging in open and constructive communication with the proposed system via the presented stimulus, it is possible to analyze and evaluate the emotional and financial priorities of the user, as well as the risk profile. Moreover, the system is passive, relaxed and discrete. There is no need to engage into a full two-way communication like during a personal interview. The user only needs to subject himself to the stimulus, usually a video communication message. Also, the system is simple and presents an engaging user experience, all you need to do is to watch the stimulus and concentrate on the content of the stimulus. Moreover, the system can provide for an emotional feedback to the user or client, or to the financial advisor that has instructed the client to use the system, to allow a further discussion and analysis between the two parties. In addition, the system allows to create and establish a better understanding, self-awareness on financial issues or generally money-related issues of a user. For example, a user or a financial manager can learn about how they may act in difficult situations, without actually having to experience these difficult situations, for example a stock exchange market crash. Also, the system allows to compare the reaction of a user of the system with a spouse, friends, or peers. For example, a client and their spouse can compare how their emotional reaction compares to each other, for example to see if there are similar reactions to different situations, and to quantitatively measure these differences. Different users can be compared to each other, or can be compared to peers or predefined categories of users, so that their true objectives can be understood and classified.

Second, with the present system, method and device, it is possible that a financial advisor can accurately identify preferences of clients, and analyze risks associated to them. For example, once different potential or existing clients have been analyzed and evaluated by the system, the advisor can better recommend a financial portfolio which meets the real needs of his client, taking into consideration the opinions and emotions of the spouse, and thereby the advisor can identify true client preferences. The system can help to understand the emotional preferences of the client. For example, it can offer unique insight into the client emotional priorities that may not be discoverable in a personal interview. Also, it is possible to build and strengthen new and existing relationships with your clients. Specifically, with respect to younger clients, it is possible to engage with so-called elusive millennials. With the system, the rational and emotional reactions and priorities can be evaluated and analyzed. In this respect, the system allows to open doors to a new client base that are hard to reach with conventional tools and client prospection. Furthermore, the system allows to drive higher conversion rates, conversion rates being a percentage or ratio of prospective customers who take a specific action that is desired by the portfolio manager or sales person, for example being hired or engages as new clients. By evaluating different users, it is possible to generate quality leads to better understand priorities of a client. Also, the conversion of a financial portfolio of a client can be substantially improved. In addition, the current franchise of clients can be retained for longer periods of time, by having more information on their emotional and decisional landscape.

Third, with the system, device and method, it is possible to improve regulatory and safety security and compliance of a company or other business entity. For example, with the system, it is possible to make sure that a portfolio of the client matches needs or legal requirements of a proper informed consent. For example, regarding client rational and emotional self-awareness, it is possible to identify and consider inconsistencies between the reality and a self-image. Moreover, the system allows to create a high-level of financial personalization of portfolios and other types of investments. Properly informed decision are possible, with spouse and improved client retention and conversion. Stronger compliance with regulatory frameworks are possible. For example, it is possible to have knowledge of client rational and emotional self-awareness, and that inconsistencies can be identified and considered. This allows to prepare for regulatory frameworks in the field of client financial management. In turn, a strong matching between a portfolio of a client and his or her emotional and rational needs can be achieved, and proper informed consent for the portfolio can be received, to comply with regulatory guidelines or rules on informed consent in the field of portfolio management. As discussed earlier, it is possible to drive higher conversion rates, by mapping profiles to individual portfolios to meet true goals and realistic expectations.

The present method 100 and system 200 have many application fields. According to some aspects of the present invention, the herein presented method, system, and device present several opportunities for implementation into a large variety of application fields and sectors, providing several substantial benefits and advantages. Generally, the system can be used in applications where it is desirable to understand the underlying feelings about a subject area where the customer may either consciously or unconsciously conceal their true feelings. With the present system, it is possible that the core of the method steps, and the underlying algorithms and analysis remain the same for every sector, however stimulus, for example the video message that is to be analyzed by the system, can vary from case to case. The advantage of using a set video message is that the comparison is the same for every user and therefore baselines and correlations can be created to provide an analytical report by the system. The system can allow the user to assess risk using artificial intelligence through facial recognition and body language in the video communication message that is presented to the user. Some of the main application fields for the system are in financial services, insurance business, human relations (HR), and personal communication and training.

For example, in the field of financial services, the system can be used in wealth management to accurately match or improve selection of financial products for a client. The largest amount of global private wealth, equal to 60.4 trillion US dollars in 2015, was concentrated in the United States. The value of private wealth in Western Europe and Asia Pacific in 2015 amounted to 40.8 trillion and 36.6 trillion U.S. dollars respectively. The private banks with the largest amount of assets under management in 2015 were UBS (1.74 trillion U.S. dollars), Bank of America Merrill Lynch (1.44 trillion U.S. dollars) and Morgan Stanley (2.03 trillion U.S. dollars). The largest wealth management companies were Morgan Stanley Wealth Management (0.97 trillion U.S. dollars) and JP Morgan (0.66 trillion U.S. dollars).

Moreover, in the insurances sector, there is a need to analyze clients for decisions made for selecting or changing private insurance coverage. With a 32% share of the global market, the European insurance industry is the largest in the world, followed by North America (31%) and Asia (30%). Total European direct gross written premiums increased by 1.3% between 2014 and 2015 to reach €1 200 bn. Life premiums grew 1.2% to €730 bn, non-life premiums grew by 1.1% to €343 bn and health premiums grew 1.5% to €124 bn. European insurers paid out €976 bn in claims and benefits to insureds, a 2.0% increase on 2014.

In the field of HR, the system can be used to analyze candidates for a job position in recruitment. For example, a specific video communication message that describes critical or important job or private life related events and subsequent important decisions can be presented to the user, for analyzing the reactions of the user. In 2013, a total number of 60.9 million people worldwide gained access to the work force through a private employment agency. The figure in Europe was 8,736,095, an increase of 9.6% from 2012. In search and selection, or permanent recruitment as it also may be called, an agency sources the right candidates for a client company that ultimately hires the candidate. The present system can be used to play a significant role in ensuring that the right candidate is selected for a role, as an additional factor for selecting a candidate. There has been a significant growth in psychometric testing in recent years to assess whether a candidate is a suitable fit for a role within a company, however these systems do have flaws and can give misleading results. The present system provides the interviewees emotional response to questions and topic areas and this cannot be hidden. This would therefore provide a much greater insight into the candidate and whether they are an appropriate match for a specific job position.

In personal communication, the present system can be used as an integral part of a social media side, for example to analyze reactions of potential users or customers for a particular brand or product advertising. For example, the brand or advertising can be the video communication message that is inputted to the system. Responses to particular brand and product information can be generated by the system that allows companies or other parties to tailor their messages to obtain maximum impact across a range of client demographics.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. An automated image processing method for assessing a behavioral profile of an individual, the behavior profile being specific to a hypothetical or actual event, comprising:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual,
   wherein the step of correlating, an emotional factor in relationship with the topical area is determined for the individual, and the emotional factor is normalized based on a thinking type classification of the individual.

2. The method of claim 1, further comprising a step of: modifying an existing behavioral assessment for the event of the individual based on the generated report.

3. The method of claim 1, wherein the topical area includes at least one of insurance coverage, risk management, investment positions, tax, employee benefits, retirement, or estate planning.

4. The method of claim 1, wherein the non-verbal communication includes facial micro-expressions of the individual.

5. The method of claim 1, wherein the stimulus includes an audiovisual presentation that includes images and speech that is related to the event, the images and speech intended to evoke emotions specific to the event.

6. The method of claim 1, wherein the stimulus includes a presentation of specific questions related to the event to the individual.

7. The method of claim 1, wherein the event includes a reduction of a value of an investment portfolio above a certain predefined percentage, the method further comprising a step of:
   generating the report by using the behavior profile, the report providing information to warn the individual from improperly allocating funds to an investment portfolio having a fluctuation that is outside an emotional capacity of the individual.

8. The method of claim 1, wherein the event includes a life changing accident to the individual, the method further comprising a step of:
   generating the report by using the behavioral profile, the report providing information to determine an insurance to cover a financial hardship upon occurrence of the event to the individual.

9. The method of claim 1, wherein the step of correlating comprises reading a facial action coding system (FACS) of the individual to determine at least one of happiness, surprise, fear, anger, disgust, and sadness, during a predetermined time duration, and assigning values of the FACS to the event.

10. The method of claim 4, wherein the facial micro-expressions of the individual reflects a coronary reaction.

11. The method of claim 1, further comprising the step of:
   providing a graphical user interface showing the report and a report on behavior profiles of peers.

12. A non-transitory computer readable medium, the computer readable medium having computer code recorded thereon, the computer code configured to perform an image processing method when executed on a data processor, the image processing method configured for assessing a behavioral profile of an individual, the behavior profile being specific to a hypothetical or actual event, the method comprising:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual,
   wherein the step of correlating, an emotional factor in relationship with the topical area is determined for the individual, and the emotional factor is normalized based on a thinking type classification of the individual.

13. The non-transitory computer readable medium of claim 12, the method further comprising a step of:

modifying an existing behavioral assessment for the event of the individual based on the generated report.

14. The non-transitory computer readable medium of claim 12, wherein the topical area includes at least one of insurance coverage, risk management, investment positions, tax, employee benefits, retirement, or estate planning.

15. The non-transitory computer readable medium of claim 12, wherein the non-verbal communication includes facial micro-expressions of the individual.

16. An automated image processing method for assessing a behavioral profile of an individual, the behavior profile being specific to a hypothetical event, the event including a reduction of a value of an investment portfolio above a certain predefined percentage, the method comprising:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual, the report providing information to warn the individual from improperly allocating funds to an investment portfolio having a fluctuation that is outside an emotional capacity of the individual.

17. An automated image processing method for assessing a behavioral profile of an individual, the behavior profile being specific to a hypothetical event, the event including a life changing accident to the individual, the method comprising:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual, the report providing information to determine an insurance to cover a financial hardship upon occurrence of the event to the individual.

18. A non-transitory computer readable medium, the computer readable medium having computer code recorded thereon, the computer code configured to perform an image processing method when executed on a data processor, the image processing method configured for assessing a behavioral profile of an individual, the behavior profile being specific to a hypothetical event, the event including a reduction of a value of an investment portfolio above a certain predefined percentage, the method comprising the steps of:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual, the report providing information to warn the individual from improperly allocating funds to an investment portfolio having a fluctuation that is outside an emotional capacity of the individual.

19. A non-transitory computer readable medium, the computer readable medium having computer code recorded thereon, the computer code configured to perform an image processing method when executed on a data processor, the image processing method configured for assessing a behavioral profile of an individual, the behavior profile being specific to a hypothetical event, the event including a life changing accident to the individual, the method comprising the steps of:
   detecting non-verbal communication from a physiognomical expression of the individual based on image data by a first computer algorithm, the image data being created by exposing the individual to a stimulus and obtaining the physiognomical expression of the individual in response to the stimulus;
   correlating features of the non-verbal communication to a topical area by a second computer algorithm; and
   generating a report corresponding to the individual that reflects the correlation between the non-verbal communication and the topical area, the report including the behavior profile of the individual, the report providing information to determine an insurance to cover a financial hardship upon occurrence of the event to the individual.

\* \* \* \* \*